Feb. 22, 1966 T. M. HERTZ 3,237,168

INSTRUCTION SEQUENCE CONTROL FOR A DIGITAL COMPUTER

Filed April 13, 1962 33 Sheets-Sheet 1

INVENTOR.
THEODORE M. HERTZ

BY L. Lee Humphries

ATTORNEY

A REGISTER—41 BITS
36 BITS ON DISC 5 BITS IN
FF A2, A1, A41, A40 & A39
SINCE NO DELAY IN A38 & A39 THEY ARE
THE SAME AS BITS BEING READ AND
RECORDED ON THE DISC

INVENTOR.
THEODORE M. HERTZ
BY L. Lee Humphries
ATTORNEY

INVENTOR.
THEODORE M. HERTZ
BY L. Lee Humphries
ATTORNEY

Feb. 22, 1966 T. M. HERTZ 3,237,168

INSTRUCTION SEQUENCE CONTROL FOR A DIGITAL COMPUTER

Filed April 13, 1962 33 Sheets-Sheet 4

INVENTOR.
THEODORE M. HERTZ
BY L. Lee Humphries
ATTORNEY

Feb. 22, 1966 T. M. HERTZ 3,237,168

INSTRUCTION SEQUENCE CONTROL FOR A DIGITAL COMPUTER

Filed April 13, 1962 33 Sheets-Sheet 5

INVENTOR.
THEODORE M. HERTZ

BY L. Lee Humphries

ATTORNEY

INSTRUCTION SEQUENCE CONTROL FOR A DIGITAL COMPUTER

Filed April 13, 1962

33 Sheets-Sheet 6

INVENTOR.
THEORDORE M. HERTZ

BY L. Lee Humphries

ATTORNEY

INSTRUCTION SEQUENCE CONTROL FOR A DIGITAL COMPUTER

Filed April 13, 1962 33 Sheets-Sheet 7

INVENTOR.
THEODORE M. HERTZ
BY L. Lee Humphries
ATTORNEY

INSTRUCTION SEQUENCE CONTROL FOR A DIGITAL COMPUTER

Filed April 13, 1962 35 Sheets-Sheet 8

INVENTOR.
THEODORE M. HERTZ
BY L. Lee Humphries
ATTORNEY

INVENTOR.
THEODORE M. HERTZ
BY L. Lee Humphries
ATTORNEY

In MODE

In=I4'I2I1

Iq FIG. 2a

Ic FIG. 2c

ALL OPERATION CODE MODES FIGS. 2f,g,h, i,j,k,m,n. If previous command not a transfer but was a left hand command In FIG. 2e U1 D5'D4 FIG. 2f OPERAND ADDRESS ANALYSIS MODE
I4'KaI1Do'Kc 1. Mode is commenced by turning on Kc and I2
   1kc=IcDoKo
   Ko=Kc'T41
   1i2=IcDoKo
2. Ka and S FFs set for main memory or quick access loop addresses as in FIG. 2b.
3. (a) Have Z41 copy B register into Z register or if indexing required have it add G register index bits during N5 timing. Simplified notation used here. First term indicates B1 is copied during R42' (no indexing); second term indicates recirculate Z register if Go exists and third term Ix is set as a function of R42 (indexing required).
   z41=B1InKcGo'R42'+Z1Go
   +Ix(B1G1R43+B1G1'R43'
   +B1'G1R43'+B1'G1'R43)
   (b) Gate Ix combines timing function of N5 and R42 which resets at T14.
   Ix=I2I1N5R42
   or42=I3a'KcT14
   1r42=IcDoB41'T22 (see previous step 2)
   (c) R43 is used as a carry flip flop in subtracting the index in the G register from the index in the B register. The second term of the first equation below creates a preliminary carry which together with the fact that the index bits in the G register are in one complement, act to subtract the index from the B register. Thus, addition of the complement as shown in FIG. 3a causes the G register index to be subtracted from the B register.
   1r43=B1G1Ix+I4'I1T1
   or43=B1'G1'Ix
   (d) N5 is set at T1 to copy B register operand address and operation code (bits 2 to 20) into FFs D6 to 1 and C6 to 1. N5 is turned off at T20. But if G1 is zero at T22, N5 is turned on again because it indicates the left hand command (bits 23-40) will be copied. N5 is then turned off at T40.
   1n5=T1InDo'+G1'T22InDo'
   on5=T20I4'
   d6=B1Go'InN5Kc+Z1GoN5I3a'I2I4'
   (e) The first term of the last equation above copies the right hand command in the B register, then replaces it with the left hand command if N5 turns on at T22 indicating a left hand command.
   (f) Although Go is reset in Ic mode (previous) it remains so at least until T22, and allows D6 and Z41 to copy bits 2 to 20 (right hand command). If a left hand command should be copied, Go' remains and N5 turns on again and allows D6 and Z41 to copy the left hand command found in the B register. If not, Go is set as follows:
   1go=G1T22InKc+I1'K41
   and the right hand command stays in the registers.
4. This mode may be entered from the operational code modes after a command which was not a transfer command and was a left hand command (that is, the next command will be a right hand command). See under TRANSITIONS in the specification and see FIG. 2f.
5. This mode may proceed directly to U1(D5'D4) if operand access is not required and no indexing is required.
   The I1 flip flop is set as follows:
   oi1=InD5'D4T41
   The operation codes of the computer are so numbered and segregated that when held in the D register the D5 flip flop is true for all operations requiring operand access and false for all not requiring it. Flip flop D4 is true for those operation codes in which indexing is not required and false for those for which it is required.

FIG. 2d

INVENTOR.
THEODORE M. HERTZ
BY L. Lee Humphries
ATTORNEY

Feb. 22, 1966 T. M. HERTZ 3,237,168

INSTRUCTION SEQUENCE CONTROL FOR A DIGITAL COMPUTER

Filed April 13, 1962

33 Sheets-Sheet 11

INVENTOR.
THEODORE M. HERTZ

BY L. Lee Humphries

ATTORNEY

Feb. 22, 1966

T. M. HERTZ 3,237,168

INSTRUCTION SEQUENCE CONTROL FOR A DIGITAL COMPUTER

Filed April 13, 1962

33 Sheets-Sheet 12

INVENTOR.
THEODORE M. HERTZ

BY L. Lee Humphries

ATTORNEY

OPERATION MODF
U1 D5'D4'

In
FIG. 2e

OPERATION MODE, NO OPERAND ACCESS, INDEXING MAY BE SPECIFIED
I4'I2I1'Do'Kc'
0 1 0 0 0

1. These operations are input, output, shifts, store and copy commands (Operation Codes 0 to 5 and 40 to 45). Some specify indexing but none require operand access. Some operations are capable of completion in one word time. The mode is terminated by setting Kc.
   1kc=U1D52D4'D1'C6A1T40+MsLD5'C6ST40 +G1KgI3aT20C1'Fa'
   1fa=MooD2' ofa=I1
   D52=D5'D2
   Moo=I3aD5D4D3T41'
2. If input (Op code 00) or output (01) are involved, modes Ia or Io are entered by setting I4
   1i4=I3D6'D53D2'Ko
   I3=I4'I1'Do'I3a'
   D53=D5'D3'
   Ko=Kc'T41
   oi3a=K41+Td
3. For output operation I2 is left on, and for input it is turned off.
   oi2=I3KoD4'
   1d4=I3D6'D3'D2'D1T40
   D4 it is noted is turned on by the output copy operation command as detected in the D flip flops. Information entered with the D register shifts through the C register into the A register where it is recorded at the most significant end. Entry of the next eight bits into the next eight bit locations in the A register requires an 8-bit delay to shift the A register. Five eight-bit entries will thus complete one word. Bit one being used for sync as always. Output is similar, with eight bit groups being removed one at a time from the most significant end.
4. For both input and output operation codes, the complements of bits 3 to 8 for right hand commands and 23 to 28 for left hand commands are transferred to the G register which constitute a character counter.
   g41=C1'InKg..' +G1Kg'T41'+G1'KgI1'Do'
   1kg=GoI4'T1+Go'I4'T34
   okg=T20
   The above will allow the G register to copy the complement of the D and C shift registers and circulate such information. Input and output character counting is controlled by Kg as follows:
   1kg=GoN5I2'T14P6'P1+Go'N5I2'T14P6P1(input) +GoI4'T14P6'P1+Go'I4T14P6P1 (output)
   okg=G1'KgI1'Do'+T20
   1n5=PD3T1
   PD3=I4S'KaI1' (input)
5. Kc is set when the correct number of characters have been counted
   1kc=G1KgI4T20C1'
   1c1=C2N7(for more than 64 characters)
   oc1=G1KgI4T20
   and the input or output mode is terminated by I4 and I1 being turned on to return to In or Ic modes. I2 flip flop determines which (In or Ic) as in step 3 of D5'D4 mode.
   oi4=I4K41
   1i1=I1'K41
6. If a shift or various copy and store commands are involved, flip flop I2 is reset and mode UiDo' is entered.
7. If it happens that a shift is involved (normalizing or specified) and the shift is zero Ic or In will be entered directly from this mode, because Kc (step 1 above) will be set by A1 or G1Kg.

UiDo'
FIG. 2h

Ic, In
FIG. 2b, 2d

FIG. 2g

INVENTOR.
THEODORE M. HERTZ
BY L. Lee Humphries
ATTORNEY

OPERATION MODE
U1Do', D5'

U1
D5'D4'
FIG. 2g

OPERATION MODE UiDo'
I4'I2'I1'Do'Kc'
0 0 0 0 0

1. This mode is entered under U1, D5'D4', when I2 is turned off.
   oi2=NR3KoD4'
   NR3=I4'I1'
   Ko=Kc'T41
   Shifting, copying or storing is ordered in this mode.
2. If normalizing is ordered (left shift until a binary one appears in the most significant digit), it will be ordered by C6 being set, as in codes 2.4 and 42.4. See FIGS. 10 and 11. Shifting is terminated as soon as a binary one is detected in the S flip flop at T40 time. S forms part of A register during left shifting.
   1kc=MsLD5'C6ST40
   MsL=D4'D3I3aC4'
   I3a=U1D52T1
   D52=D5'D2
3. If left shifting a specified number of places is ordered, the complement of the number of shifts is placed in the G register character counter (bits 15 to 20 or 35 to 40) as shown in step 4, FIG. 2g, and the G register is counted up to overflow (wherein the correct number of shifts has taken place), at which time Kc is set, to turn off the shifting and return to Ic or In. → Ic, In FIGS. 2b 2d
   1kc=G1KgC3I3aT20C1'
   C1 is here used as an overflow indicator for the G register
   oc1=G1KgI3aT20
4. As to the storing or copying commands, sector comparison is made to locate the correct address as in FIG. 2c. Copying is identical, however as to storing in the memory, it will be noticed that the writing heads are 180° displaced from the sector reading head. Thus the sector comparison logic is reversed in the most significant bit in order to write at the proper instant. That is, the write head is at sector 000 000 (00,octal) when the sector flip flop is reading sector 100 000 (38,octal), commencing the second half of the memory sectors. Therefore, comparison flip flop So must have additional logic to include such reversal of the most significant sector bit when storing information.
   1so=Z1S1WsT8+Z1'S1'WsT8
       +Z1S1WsT28+Z1'S1'WsT28
   Ws=I4'I1'D4'D3D2Do'
   T8=P6'P4'P3P1'Ka'Go
   Thus, So will remain unset (and indicate sector arrival) when the correct recording sector is recorded.
5. When the correct sector arrives, flip flop Do is set and mode UiDo is entered.

UiDo
FIG. 2i

FIG. 2h

INVENTOR.
THEODORE M. HERTZ
BY L. Lee Humphries
ATTORNEY

INVENTOR.
THEODORE M. HERTZ
BY L. Lee Humphries
ATTORNEY

INVENTOR.
THEODORE M. HERTZ
BY L. Lee Humphries
ATTORNEY

INVENTOR.
THEODORE M. HERTZ
BY L. Lee Humphries
ATTORNEY

INVENTOR.
THEODORE M. HERTZ
BY L. Lee Humphries
ATTORNEY

OPERATION MODE
UiDo(D5)

UiDo
(D5)
FIG. 2m

OPERATION MODE
I4'I2'I1'DoKc'
0 0 0 1 0

1. To perform 25.1 (store index address in right hand portion of A register in right hand command at address specified in the memory) the index address in A is copies into B for recirculation during U1 under control of R42
   1r42=D2'D1U1R43T1
   or42=D5I3a'T14I1'
   1r43=I4'I1T1
   (R43 remaining one set from In)
2. R42 during U1 gates the complement of the G register index into the B register. The remainder of the B register remains unchanged.
   b41=G1'NR1D5+B1I4'Do'R42'
   NR1=R42D6'I1'Fm'
   ofm=I1T1
   (Fm remaining set from In).
3. During UiDo' (previous mode) the location where the B register contents are to be stored (location indicated by the Z register) is located and when sector agreement reached the appropriate write flip flops store the contents of B in the memory. Do is set to cause entering the instant mode.
   1do =So'UiD4'D2'Do'T42
   Ui =I4'I2'I1'
   1mw1=B1M6MtmT1'
   omw1=B1'M6Mtm+M6Ka'D3T1
   1mw2=B1'M6Mtm+T1
   omw2=B1M6MtmT1'
   v41 =B1M6LtmS
   L41 =B1M6LtmS'
   Mtm =Ka'D3D1
   Ltm =KaD3D1
   M6 =I2'I1DoD4'D2'
3. (Continued)
   The Kc flip flop terminates the mode after one word time (when the command has been properly stored). Ic or In is returned to.
4. The store address (65) in A at address specified is similarly performed. Flip flop R42 controls transfer of A address to B before search for sector during UiDo' and storage into memory during UiDo (this mode).
   1r42=D5D2'U1R43'T21D4'
   or42=D5I3a'T14I1'
   for a left hand location or
   1r42=D2'D1U1R43T1
   or42=D5I3a'T14I1'
   for a right hand location. The address in A is thus gated into B while the remainder of B circulates.
   b41=A1R42D6D2'I1'+B1I4'Do'R42'
   B40 is the writing flip flop which is set on B41.
   1b40=B41D5D4'
   ob40=B41'D4'
   Recording occurs from B into the memory as set forth in step 3 above.
5. In operation code 66 (DIV), one word time used in U1 and 40 word times in Ui. Count is kept in the G register and when completed Do is set and Kc terminates the mode for all such operations, returning the computer to In or Ic modes
   1kc=UiD3D1DoT40

Ic, In
FIG. 2b, c

FIG. 2n

INVENTOR.
THEODORE M. HERTZ
BY L. Lee Humphries
ATTORNEY

Feb. 22, 1966 T. M. HERTZ 3,237,168

INSTRUCTION SEQUENCE CONTROL FOR A DIGITAL COMPUTER

Filed April 13, 1962 33 Sheets-Sheet 20

INVENTOR.
THEODORE M. HERTZ

BY L. Lee Humphries

ATTORNEY

INSTRUCTION SEQUENCE CONTROL FOR A DIGITAL COMPUTER

Filed April 13, 1962

INVENTOR.
THEODORE M. HERTZ
BY L. Lee Humphries
ATTORNEY

AN INSTRUCTION

INVENTOR.
THEODORE M. HERTZ
BY L. Lee Humphries
ATTORNEY

INSTRUCTION SEQUENCE CONTROL FOR A DIGITAL COMPUTER

Filed April 13, 1962 33 Sheets-Sheet 23

INVENTOR.
THEODORE M. HERTZ

BY L. Lee Humphries

ATTORNEY

INSTRUCTION SEQUENCE CONTROL FOR A DIGITAL COMPUTER

Filed April 13, 1962 33 Sheets-Sheet 24

| Bit Location | DIGIT COUNTER ("P" FLIP FLOPS) | | | | | | SPECIAL DIGIT TIMES Indicated by Primary "AND" Gates and T1 and T41 FFs |
|---|---|---|---|---|---|---|---|
| | P6 | P5 | P4 | P3 | P2 | P1 | |
| 1 | 0 | 0 | 0 | 0 | 0 | 0 | 1t1 = T41P6 ot1 - T1 (Flip Flop,T1) |
| 2 | 0 | 0 | 0 | 0 | 0 | 1 | P6'P5'P3'P2'P1 |
| 3 | 0 | 0 | 0 | 0 | 1 | 0 | |
| 4 | 0 | 0 | 0 | 1 | 0 | 1 | |
| 5 | 0 | 0 | 1 | 0 | 1 | 0 | |
| 6 | 0 | 1 | 0 | 1 | 0 | 1 | |
| 7 | 0 | 0 | 1 | 0 | 1 | 1 | |
| 8 | 0 | 1 | 0 | 1 | 1 | 0 | P6'T8 |
| 9 | 0 | 0 | 1 | 1 | 0 | 0 | |
| 10 | 0 | 1 | 1 | 0 | 0 | 1 | |
| 11 | 0 | 1 | 0 | 0 | 1 | 1 | |
| 12 | 0 | 0 | 0 | 1 | 1 | 1 | |
| 13 | 0 | 0 | 1 | 1 | 1 | 0 | P6'P4'T13 |
| 14 | 0 | 1 | 1 | 1 | 0 | 1 | P6T14P2'P1 |
| 15 | 0 | 1 | 1 | 0 | 1 | 1 | |
| 16 | 0 | 1 | 0 | 1 | 1 | 1 | |
| 17 | 0 | 0 | 1 | 1 | 1 | 1 | |
| 18 | 0 | 1 | 1 | 1 | 1 | 0 | P6'P2P1'T14 |
| 19 | 0 | 1 | 1 | 1 | 0 | 0 | P6'P2'P1'T14 |
| 20 | 0 | 1 | 1 | 0 | 0 | 0 | P6'T20 |
| 21 | 0 | 1 | 0 | 0 | 0 | 0 | T41'P5P4'P3'P2' |
| 22 | 1 | 0 | 0 | 0 | 0 | 1 | P6P5'P3'P2'P1 |
| 23 | 1 | 0 | 0 | 0 | 1 | 0 | |
| 24 | 1 | 0 | 0 | 1 | 0 | 1 | |
| 25 | 1 | 0 | 1 | 0 | 1 | 0 | |
| 26 | 1 | 1 | 0 | 1 | 0 | 1 | |
| 27 | 1 | 0 | 1 | 0 | 1 | 1 | |
| 28 | 1 | 1 | 0 | 1 | 1 | 0 | P6T8 |
| 29 | 1 | 0 | 1 | 1 | 0 | 0 | |
| 30 | 1 | 1 | 1 | 0 | 0 | 1 | |
| 31 | 1 | 1 | 0 | 0 | 1 | 1 | |
| 32 | 1 | 0 | 0 | 1 | 1 | 1 | |
| 33 | 1 | 0 | 1 | 1 | 1 | 0 | P6T13 |
| 34 | 1 | 1 | 1 | 1 | 0 | 1 | P6P2'P1T14 |
| 35 | 1 | 1 | 1 | 0 | 1 | 1 | |
| 36 | 1 | 1 | 0 | 1 | 1 | 1 | |
| 37 | 1 | 0 | 1 | 1 | 1 | 1 | |
| 38 | 1 | 1 | 1 | 1 | 1 | 0 | P6P2P1'T14 |
| 39 | 1 | 1 | 1 | 1 | 0 | 0 | P6P2'P1'T14 |
| 40 | 1 | 1 | 1 | 0 | 0 | 0 | P6T20 |
| 41 | 1 | 1 | 0 | 0 | 0 | 0 | T41 1t41-T40+S1IqI2 ot41 T41 (Flip Flop,T41) |

LOGIC FOR SETTING "P" FLIP FLOPS

P1
1p1 = P5'P1'T41'* + T21
op1 = P5'P1 + T41

P2
1p2 - P1T41'*
op2 = P1' + T41

P3
1p3 = P2T41'*
op3 = P2' + T41

P4
1p4 = P3T41'*
op4 - P3' + T41

P5
1p5 = P4T41'*
op5 = P4' + T41

P6
1p6 = T21
op6 = T41

* T41' insures that the FF will not be hit on both inputs.

T13 = P5'P3P2P1' (T13,33)
T14 = P5P4P3 (T14,18,19, 34,38,39)
T20 = P5P4P3'P1' (T20,T40)
T8 = P4'P3P1'Ka' (T8,T28)

FIG. 7

INVENTOR.
THEODORE M. HERTZ
BY L. Lee Humphries
ATTORNEY

INVENTOR.
THEODORE M. HERTZ
BY L. Lee Humphries
ATTORNEY

INSTRUCTION SEQUENCE CONTROL FOR A DIGITAL COMPUTER

Filed April 13, 1962 33 Sheets-Sheet 26

BIT LOCATIONS IN EACH INSTRUCTION WORD

| OPERATION | | 41 21 | 40 20 D6 | 39 19 D5 | 38 18 D4 | 37 17 D3 | 36 16 D2 | 35 15 D1 | 34 14 C6 | 33 13 C5 | 32 31 30 / 12 11 10 / C4 C3 C2 | 29 28 27 26 25 24 23 / 9 8 7 6 5 4 3 / C1 R43 | 22 2 |
|---|---|---|---|---|---|---|---|---|---|---|---|---|---|
| 00 | ICH | | 0 | 0 | 0 | 0 | 0 | 0 | 0 | 0 | Device | No. of Characters | |
| 01 | OCH | | 0 | 0 | 0 | 0 | 0 | 1 | 0 | 0 | Device | No. of Characters | |
| 02 | ALS | | 0 | 0 | 0 | 0 | 1 | 0 | 0 | 0 | | Amount of Shift | |
| 02.2 | ASV | | 0 | 0 | 0 | 0 | 1 | 0 | 0 | 1 | | Amount of Shift | |
| 02.4 | ASC | | 0 | 0 | 0 | 0 | 1 | 0 | 1 | | | Amount of Shift | |
| 03 | ARS | | 0 | 0 | 0 | 0 | 1 | 1 | | | | Amount of Shift | |
| 05 | STR | | 0 | 0 | 0 | 1 | 0 | 1 | | | Storage Address | | |
| 10 | TIX | | 0 | 0 | 1 | 0 | 0 | 0 | | | Transfer Address | | |
| 11 | TNZ | | 0 | 0 | 1 | 0 | 0 | 1 | | | Transfer Address | | |
| 12 | SAP | | 0 | 0 | 1 | 0 | 1 | 0 | 0 | | | | |
| 12.4 | SAN | | 0 | 0 | 1 | 0 | 1 | 0 | 1 | | | | |
| 13 | CSA | | 0 | 0 | 1 | 0 | 1 | 1 | | | | | |
| 15 | TLB | | 0 | 0 | 1 | 1 | 0 | 1 | | | Transfer Address | | |
| 16 | CAZ | | 0 | 0 | 1 | 1 | 1 | 0 | 0 | | | | |
| 16.4 | CMZ | | 0 | 0 | 1 | 1 | 1 | 0 | 1 | | | | |
| 17 | CMP | | 0 | 0 | 1 | 1 | 1 | 1 | 0 | | | | |
| 17.4 | RND | | 0 | 0 | 1 | 1 | 1 | 1 | 1 | | | | |
| 25.1 | STI | | 0 | 1 | 0 | 1 | 0 | 1 | | | Storage Address | | 1 |
| 31.1 | LDI | | 0 | 1 | 1 | 0 | 0 | 1 | | | Operand Address | | 1 |
| 35 | CMG | | 0 | 1 | 1 | 1 | 0 | 1 | | | Operand Address | | 0 |
| 35.1 | CME | | 0 | 1 | 1 | 1 | 0 | 1 | | | Operand Address | | 1 |
| 36 | CLS | | 0 | 1 | 1 | 1 | 1 | 0 | | | Operand Address | | |
| 37 | CLA | | 0 | 1 | 1 | 1 | 1 | 1 | | | Operand Address | | |
| 40 | CTL | | 1 | 0 | 0 | 0 | 0 | 0 | | | Copy Start Address | | |
| 41 | CTV | | 1 | 0 | 0 | 0 | 0 | 1 | | | Copy Start Address | | |
| 42 | LLS | | 1 | 0 | 0 | 0 | 1 | 0 | 0 | 0 | | Amount of Shift | |
| 42.2 | LSV | | 1 | 0 | 0 | 0 | 1 | 0 | 0 | 1 | | Amount of Shift | |
| 42.4 | LSC | | 1 | 0 | 0 | 0 | 1 | 0 | 1 | | | Amount of Shift | |
| 43 | LRS | | 1 | 0 | 0 | 0 | 1 | 1 | | | | Amount of Shift | |
| 44 | CFL | | 1 | 0 | 0 | 1 | 0 | 0 | | | Copy Start Address | | |
| 45 | STO | | 1 | 0 | 0 | 1 | 0 | 1 | | | Storage Address | | |
| 50 | TZE | | 1 | 0 | 1 | 0 | 0 | 0 | | | Transfer Address | | |
| 51 | TRA | | 1 | 0 | 1 | 0 | 0 | 1 | | | Transfer Address | | |
| 52 | TOV | | 1 | 0 | 1 | 0 | 1 | 0 | | | Transfer Address | | |
| 53 | TMI | | 1 | 0 | 1 | 0 | 1 | 1 | | | Transfer Address | | |
| 54 | NOP | | 1 | 0 | 1 | 1 | 0 | 0 | | | | | |
| 55 | TPL | | 1 | 0 | 1 | 1 | 0 | 1 | | | Transfer Address | | |
| 56 | XAR | | 1 | 0 | 1 | 1 | 1 | 0 | | | | | |
| 57 | CAR | | 1 | 0 | 1 | 1 | 1 | 1 | | | | | |
| 63 | MPY | | 1 | 1 | 0 | 0 | 1 | 1 | | | Operand Address | | |
| 65 | STA | | 1 | 1 | 0 | 1 | 0 | 1 | | | Storage Address | | |
| 66 | DIV | | 1 | 1 | 0 | 1 | 1 | 0 | | | Operand Address | | |
| 70 | EXT | | 1 | 1 | 1 | 0 | 0 | 0 | | | Operand Address | | |
| 71 | HTR | | 1 | 1 | 1 | 0 | 0 | 1 | | | Transfer Address | | |
| 72 | SUB | | 1 | 1 | 1 | 0 | 1 | 0 | | | Operand Address | | |
| 73 | ADD | | 1 | 1 | 1 | 0 | 1 | 1 | | | Operand Address | | |
| 76 | RCS | | 1 | 1 | 1 | 1 | 1 | 0 | | | Operand Address | | |
| 77 | RCA | | 1 | 1 | 1 | 1 | 1 | 1 | | | Operand Address | | |

index indicator (bit 41/21)

FIG. 10

INVENTOR.
THEODORE M. HERTZ

BY L. Lee Humphries

ATTORNEY

| | | |
|---|---|---|
| 00 | ICH | Input number of characters from device specified |
| 01 | OCH | Output number of characters from device specified |
| 02 | ALS | Shift number in A register left by amount specified |
| 02.2 | ASV | Same as 02 with overflow indication of 1 lost |
| 02.4 | ASC | Same as 02 with normalizing- optional termination |
| 03 | ARS | Shift A register right by amount specified |
| 05 | STR | Store number in R register in address specified |
| 10 | TIX | Transfer to new location count if index $\neq$ 0, decrement |
| 11 | TNZ | Transfer if number in A register is not equal to zero |
| 12 | SAP | Set sign of A register positive |
| 12.4 | SAN | Set sign of A register negative |
| 13 | CSA | Change sign of the A register |
| 15 | TLB | Transfer if the least significant Bit of A is a one |
| 16 | CAZ | Clear A register to plus zero |
| 16.4 | CMZ | Clear A register to minus zero |
| 17 | CMP | One's complement A register bits, including sign |
| 17.4 | RND | Round A register number if most significant R bit is 1 |
| 25.1 | STI | Store index in right hand address portion specified |
| 31.1 | LDI | Read index from right hand portion of address to G41 |
| 35 | CMG | Compare, set Jo true for $B > A$, false for $B \leq A$ * |
| 35.4 | CME | Compare, set Jo true for $B > A$ or $B < A$, false for $B = A$ |
| 36 | CLS | Clear A register and subtract addressed operand |
| 37 | CLA | Clear A register and add addressed operand thereto |
| 40 | CTL | Copy from address specified to L loop to end of loop |
| 41 | CTV | Copy from address specified to V loop to end of loop |
| 42 | LLS | Long left shift A and R registers by amount specified |
| 42.2 | LSV | Same as 42 with overflow for loss of a 1 by shift |
| 42.4 | LSC | Same as 42 with normalizing - optional termination |
| 43 | LRS | Long right shift of A and R registers |
| 44 | CFL | Copy from L loop to Main memory starting at address |
| 45 | STO | Store number in A register in address specified |
| 50 | TZE | Transfer if number in A register is zero |
| 51 | TRA | Transfer unconditionally |
| 52 | TOV | Transfer on overflow (no halt if overflow) |
| 53 | TMI | Transfer if A register sign is negative |
| 54 | NOP | No operation |
| 55 | TPL | Transfer if A register sign is positive |
| 56 | XAR | Interchange A and R registers |
| 57 | CAR | Copy A register into the R register, clear A |
| 63 | MPY | Multiply A number by operand in address specified |
| 65 | STA | Store address in A register in address specified |
| 66 | DIV | Divide A number by operand in address specified |
| 70 | EXT | Logical multiplication of A number by operand specified |
| 71 | HTR | Halt and transfer unconditionally |
| 72 | SUB | Subtract operand specified from A register number |
| 73 | ADD | Add operand specified to A register number |
| 76 | RCS | Clear and subtract (Copy A to R) |
| 77 | RCA | Clear and Add (Copy A to R) |

* Assume overflow was off; if overflow was on initially then if B = A O, do nothing; if B A O, reverse JO

FIG. 11

INVENTOR.
THEORDORE M. HERTZ
BY L. Lee Humphries
ATTORNEY

INVENTOR.
THEODORE M. HERTZ
BY L. Lee Humphries
ATTORNEY

INSTRUCTION SEQUENCE CONTROL FOR A DIGITAL COMPUTER

Filed April 13, 1962 33 Sheets-Sheet 29

INVENTOR.
THEODORE M. HERTZ
BY L. Lee Humphries
ATTORNEY

INVENTOR
THEODORE M. HERTZ
BY T. Lee Humphries
ATTORNEY

INVENTOR.
THEODORE M. HERTZ
BY L. Lee Humphries
ATTORNEY

INSTRUCTION SEQUENCE CONTROL FOR A DIGITAL COMPUTER

Filed April 13, 1962 33 Sheets-Sheet 32

INVENTOR.
THEODORE M. HERTZ
BY L. Lee Humphries
ATTORNEY

Feb. 22, 1966 T. M. HERTZ 3,237,168

INSTRUCTION SEQUENCE CONTROL FOR A DIGITAL COMPUTER

Filed April 13, 1962 33 Sheets-Sheet 33

INVENTOR.
THEODORE M. HERTZ
BY L. Lee Humphries
ATTORNEY

United States Patent Office 3,237,168
Patented Feb. 22, 1966

3,237,168
INSTRUCTION SEQUENCE CONTROL FOR A DIGITAL COMPUTER

Theodore M. Hertz, Whittier, Calif., assignor to North American Aviation, Inc.

Filed Apr. 13, 1962, Ser. No. 187,319
13 Claims. (Cl. 340—172.5)

This invention relates to a digital computer and, more particularly, to an improved computer control system providing considerable adaptability and flexibility.

The concept of the invention includes the features of providing in a computer an original synchronization (or commencement) mode, an idle (or readiness) mode, an instruction search (or information search) mode, and a transfer mode to transfer such instruction or information for further utilization.

Further, the invention relates to an improved sequence control wherein various flip flops are utilized to provide mode, or sequence, control as well as read, write and termination control.

It is, therefore, an object of this invention to provide an improved control system for the operations to be carried out by a computer.

It is another object of this invention to provide a simplified yet flexible and adaptable sequence control system.

It is still another object of this invention to provide a computer which receives an instruction address, locates the address and transfers the instruction, which the computer then carries out.

A still further object of the invention is to provide a sequence control circuit wherein mode control signals may be established for input and output operations to permit the use of operation code storage flip flops for input and output during such operations.

A still further object of the invention is to provide a sequence control circuit which permits the use of operations code storage flip flops for input, output, display or other functions.

A final object of the invention is to provide a sequence control system permitting ready access and transition into the various modes of the computer in the solution of problems.

These and other objects of the invention will become apparent from the following description taken in connection with the accompanying drawings, in which FIG. 1 is a flow diagram of the computer illustrating all flip flops utilized in the computer and, in part, the various registers and their operation, and particularly the relationship between the memory, the flip flops and the logical circuitry;

FIG. 1*a* is an illustration showing the location of several circulating registers located in one channel, around a magnetic drum or disc;

FIG. 1*b* is an illustration of how a register (e.g., A register) may be comprised of flip flops together with a portion of the memory;

FIG. 1*c* is an illustration of an operation in the computer from an instruction contained in the G register;

FIG. 1*d* is a general illustration of addition and subtraction in the computer;

FIG. 1*e* is an illustration of multiplication in the computer;

FIG. 1*f* is an illustration of division in the computer;

FIG. 2 is a block diagram illustrating the mode control sequences in greater detail, indicating the state of the mode control flip flops I4, I2, I1, D*o*, K*c*, in each mode so as to establish or define such mode;

FIGS. 2*a*, 2*b*, 2*c* through 2*q* (21 and 20 not used because of possible confusion) further illustrate each step, in the initiation, operation, and ending of each of the modes shown in FIG. 2. The logic for accomplishing each of the steps is also explained;

Figure 5:
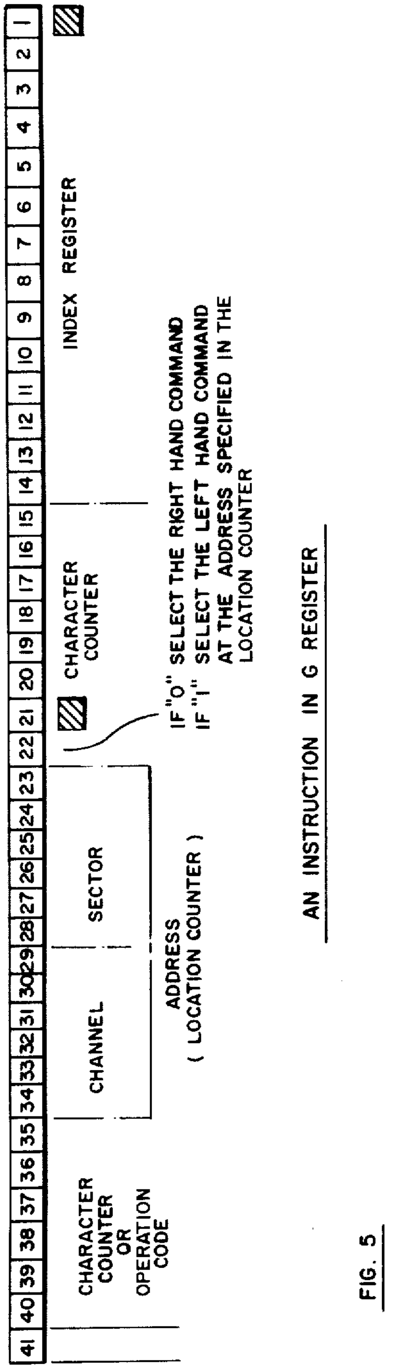
Figure 4:
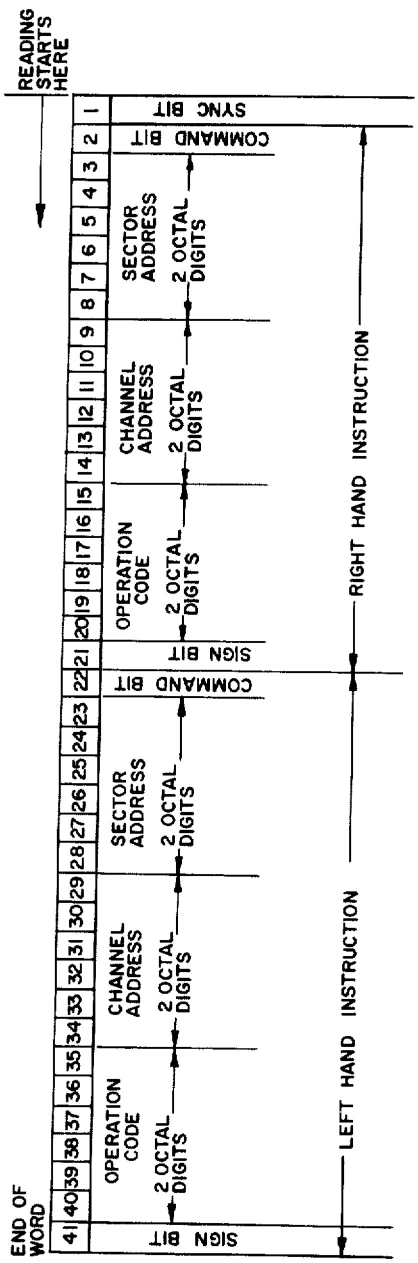
FIG. 4 is a forty-one bit word representing a left hand and a right hand instruction.
Figure 4A:
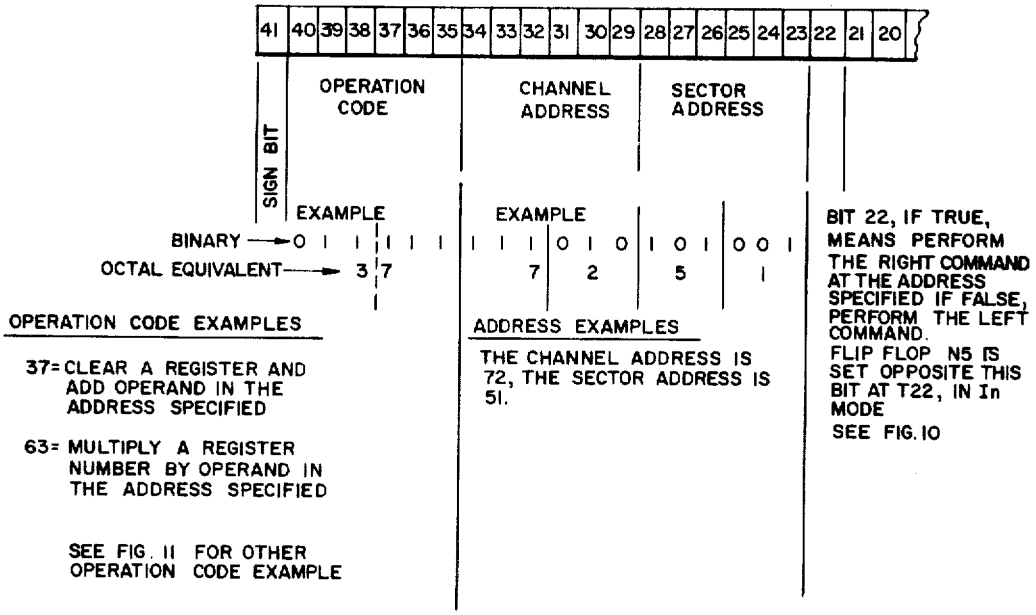
Figure 6:
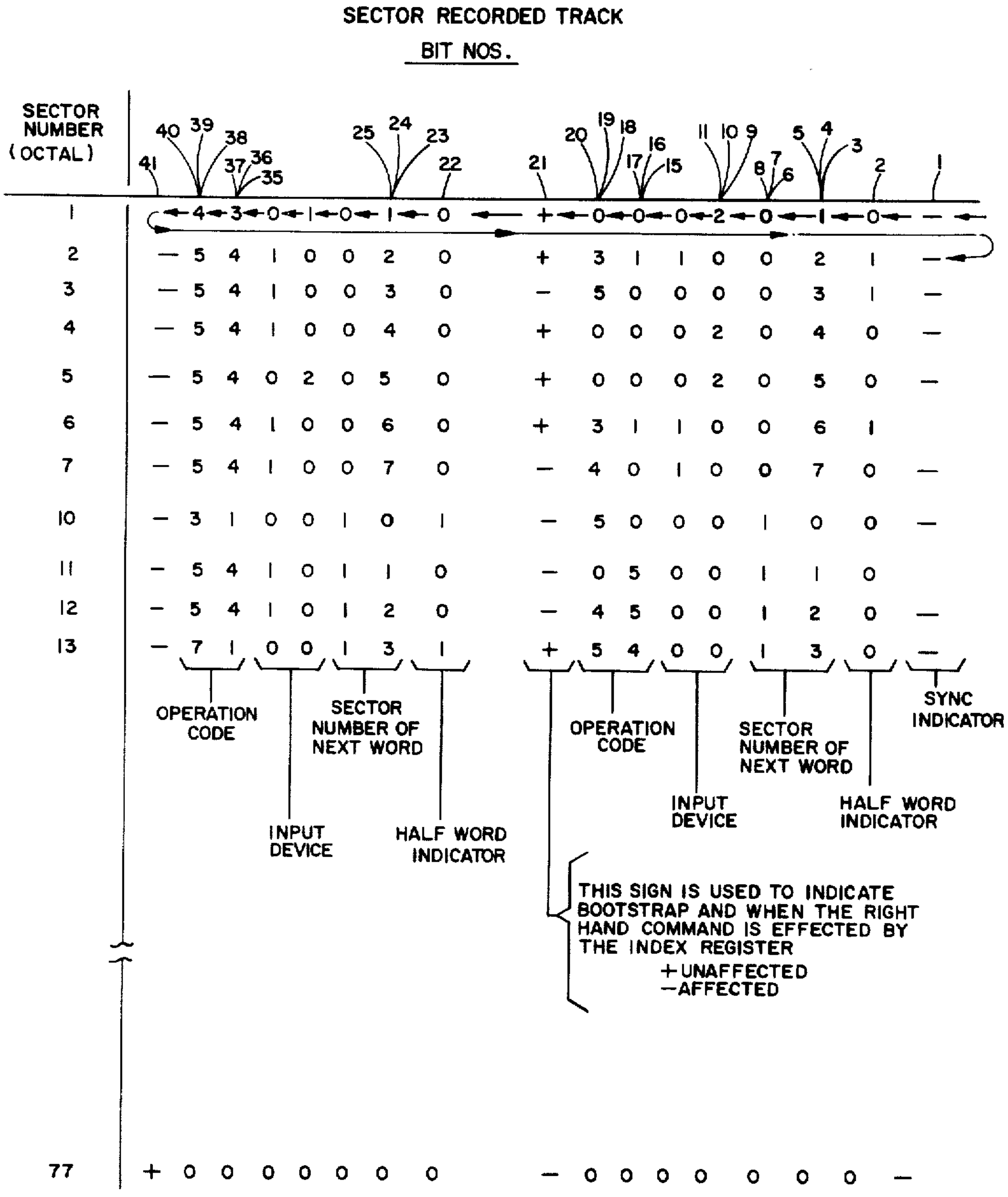
Figure 8:
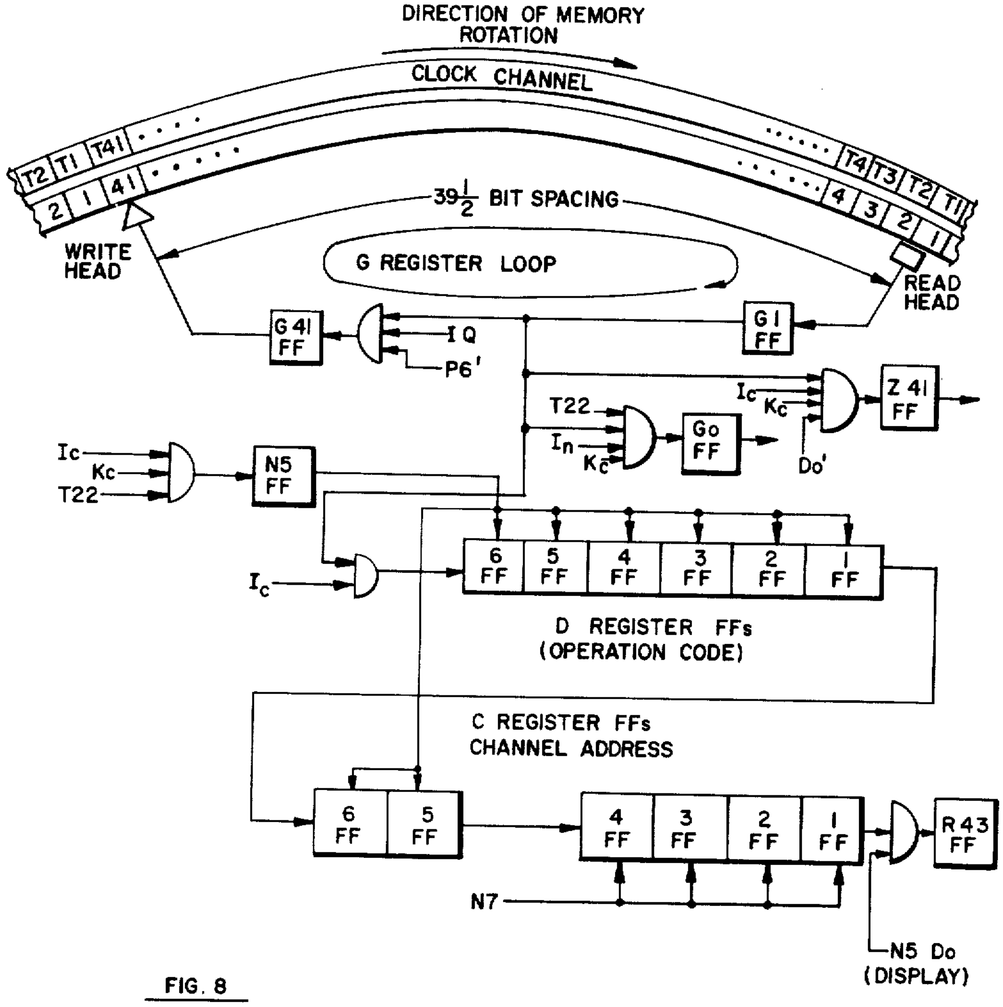

FIG. 4*a* illustrates in greater detail the information contained within an instruction. For the operation codes, the octal equivalents of the binary numbers are also shown;

FIG. 5 is an illustration of the information contained in an instruction contained in the G register;

FIG. 6 illustrates the information recorded at each of the bit locations in the sector track;

FIG. 7 illustrates the setting of the six "P" flip flops (digit counter) to represent each bit time in the forty-one bit words. The logic for setting each flip flop P1 through P6 is also shown as well as the logic for setting special digit time flip flops T1 and T41;

FIG. 8 is a block diagram illustrating transfer of information from the G register to the D and C shifting registers each comprised of six flip flops. It also shows how information may be recirculated in a one word loop from a read to a write head.

Figure 9:
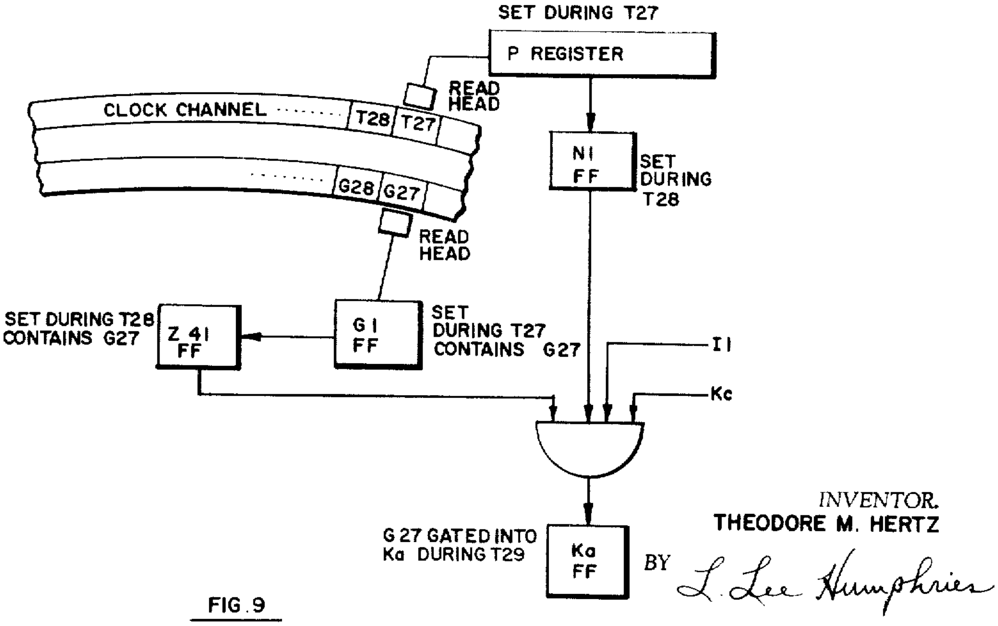

FIG. 9 is an illustration of time delays incurred in setting flip flops particularly as it applies to setting K*a* to indicate whether a main memory or quick address loop is referred to in the G register address;

FIG. 10 is an illustration of the operation codes and addresses (or amount of shift in a shifting operation, or number of characters, when only a particular number of characters are to be fed to the input or output, or in the case of transfer, the transfer address) as contained in bits 2 to 21 or bits 22 to 41 of an instruction. Also shown is the location of these bits when the instruction is contained in the D and C register flip flops as supplemented by flip flop R43.

FIG. 11 is a more complete explanation of each of the codes in FIG. 10, together with mnemonic symbols for the codes.

Figure 12:
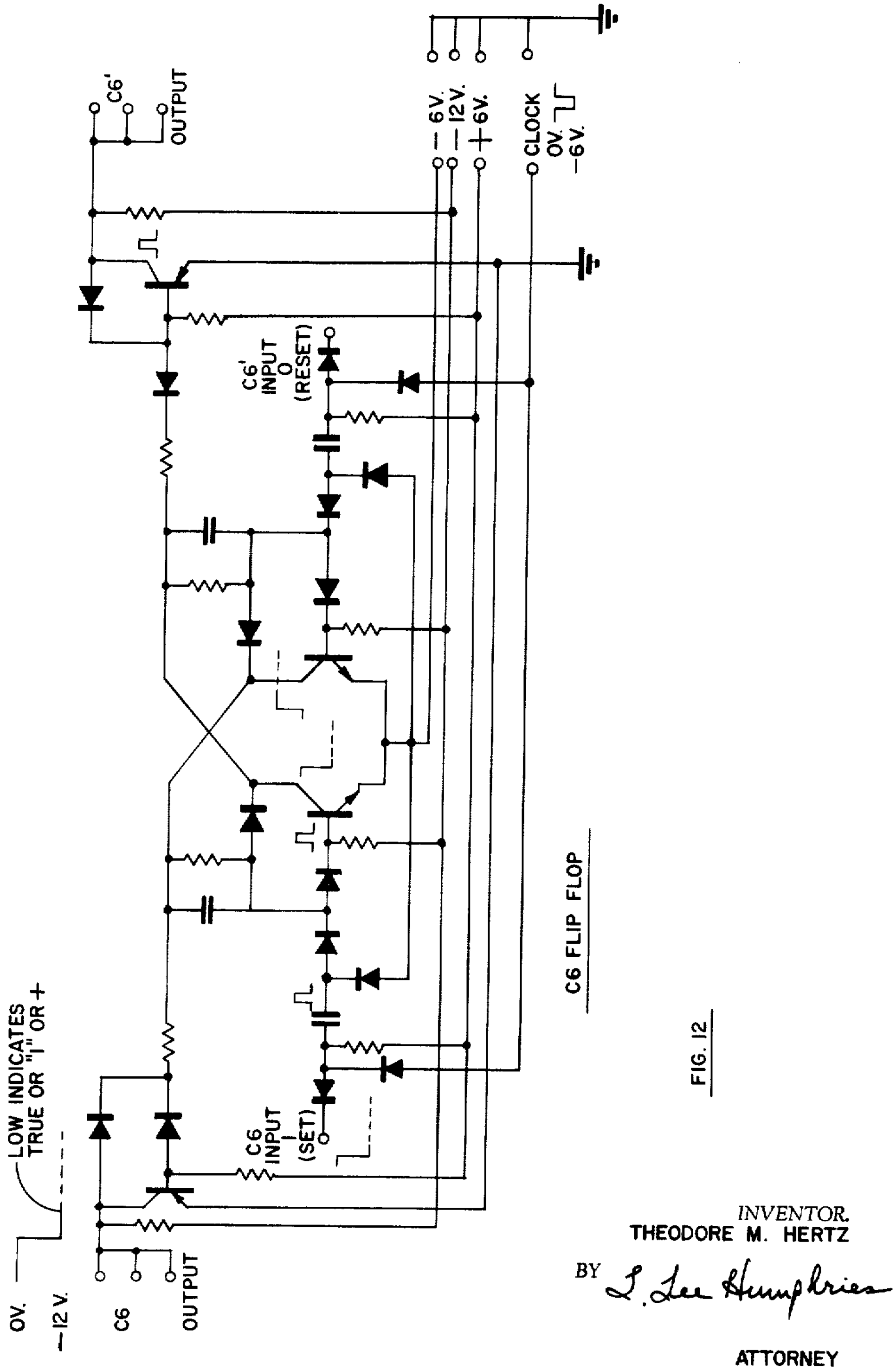

FIG. 12 is an illustration of a clock gated flip flop typical of the flip flops used in the computer.

Figure 13:
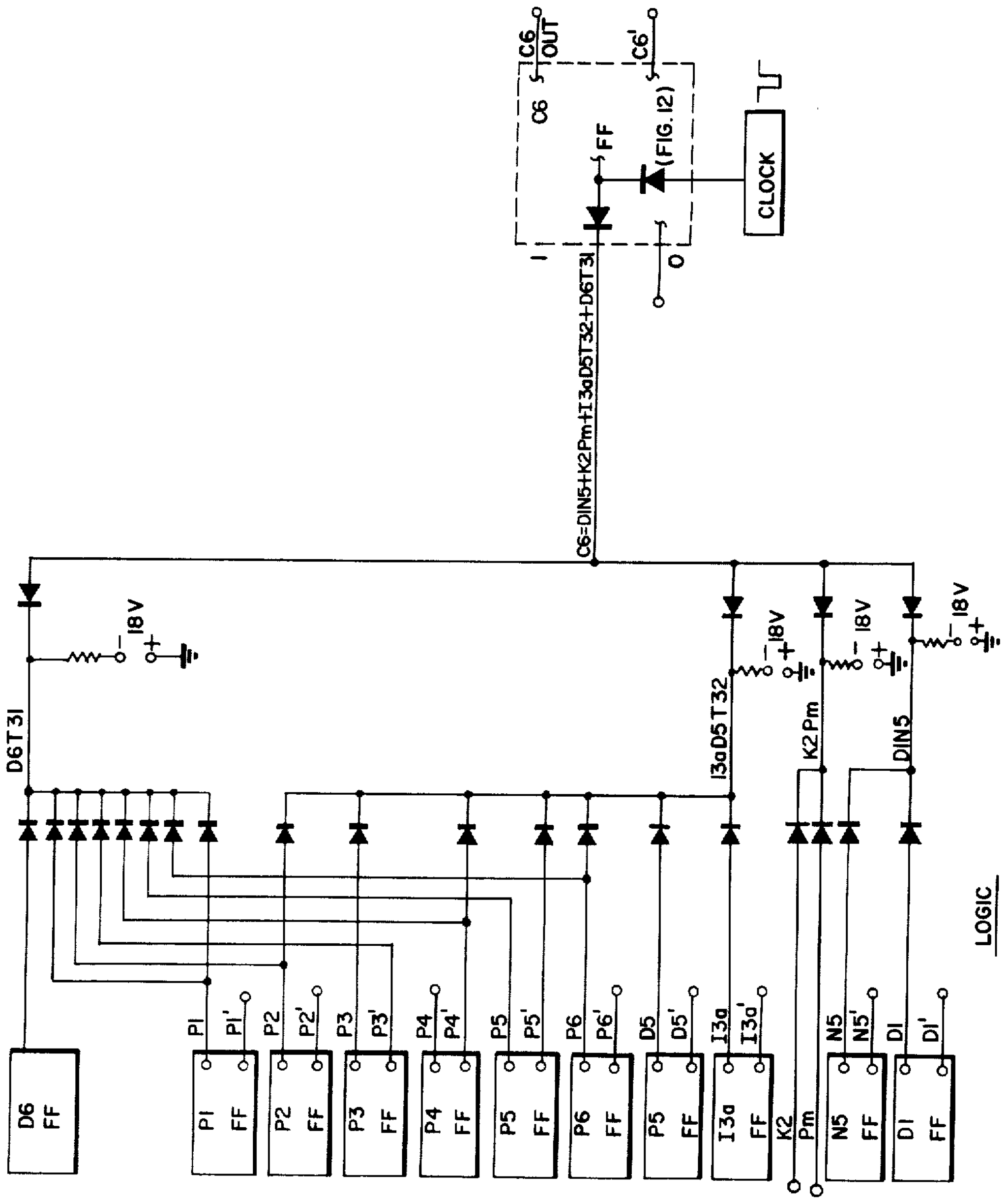

FIG. 13 is an illustration of the mechanization of the logical circuitry for a flip flop, using flip flop C6 as an example.

Figure 14:
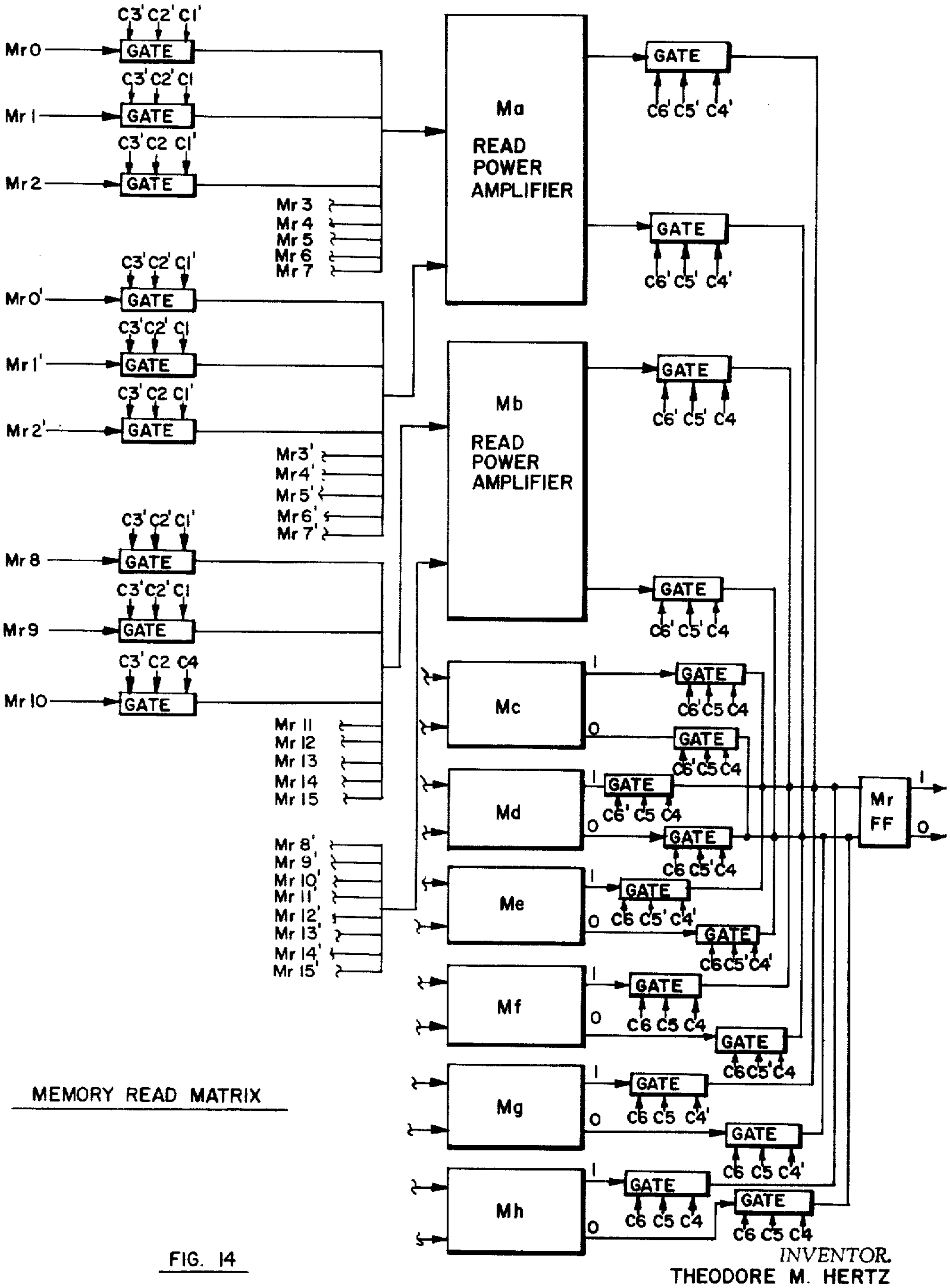

FIG. 14 is an illustration of the memory read matrix in detail, illustrating selection of the desired output in accordance with the C register.

Figure 15:
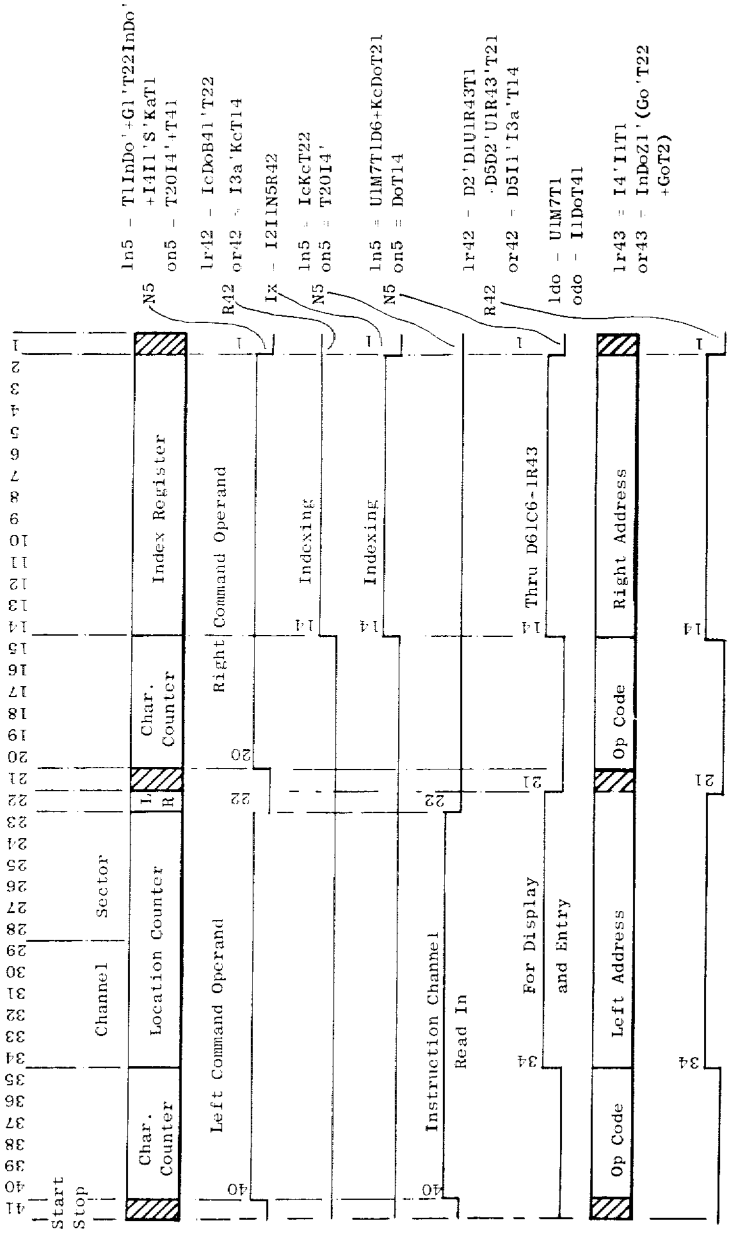

FIG. 15 is an illustration of the operation of the N5 timing flip flop and the R42 flip flop and "and" gate I*x* for indexing. Selected intervals of a word are thus obtained under the control of these devices.

Figure 16:
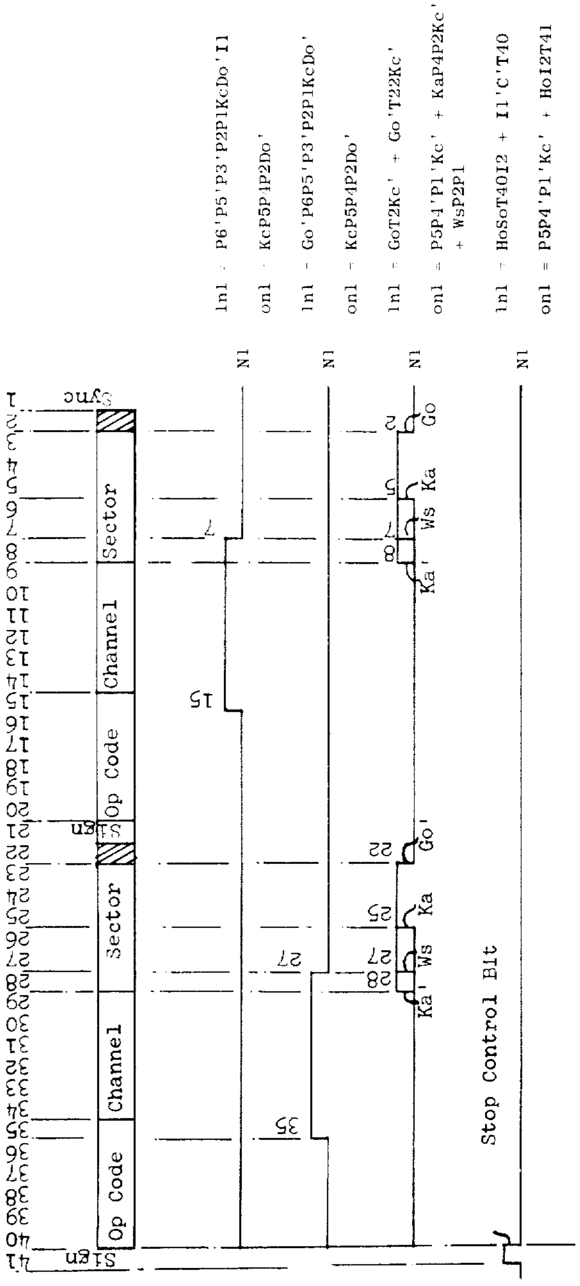
Figure 17:
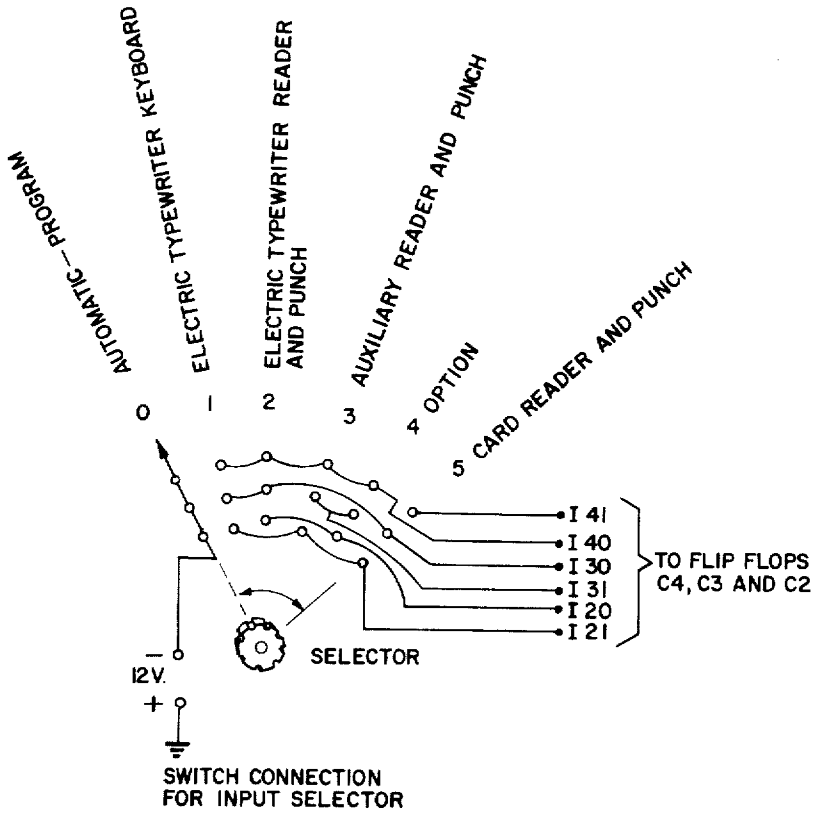

FIG. 16 is an illustration of the operation of the N1 timing flip flop to obtain selected bit intervals for channel selection control, right or left hand command selection and stop control; and FIG. 17 is an illustration of the switch connections in the input selector switch.

SYSTEM

Figure 1:
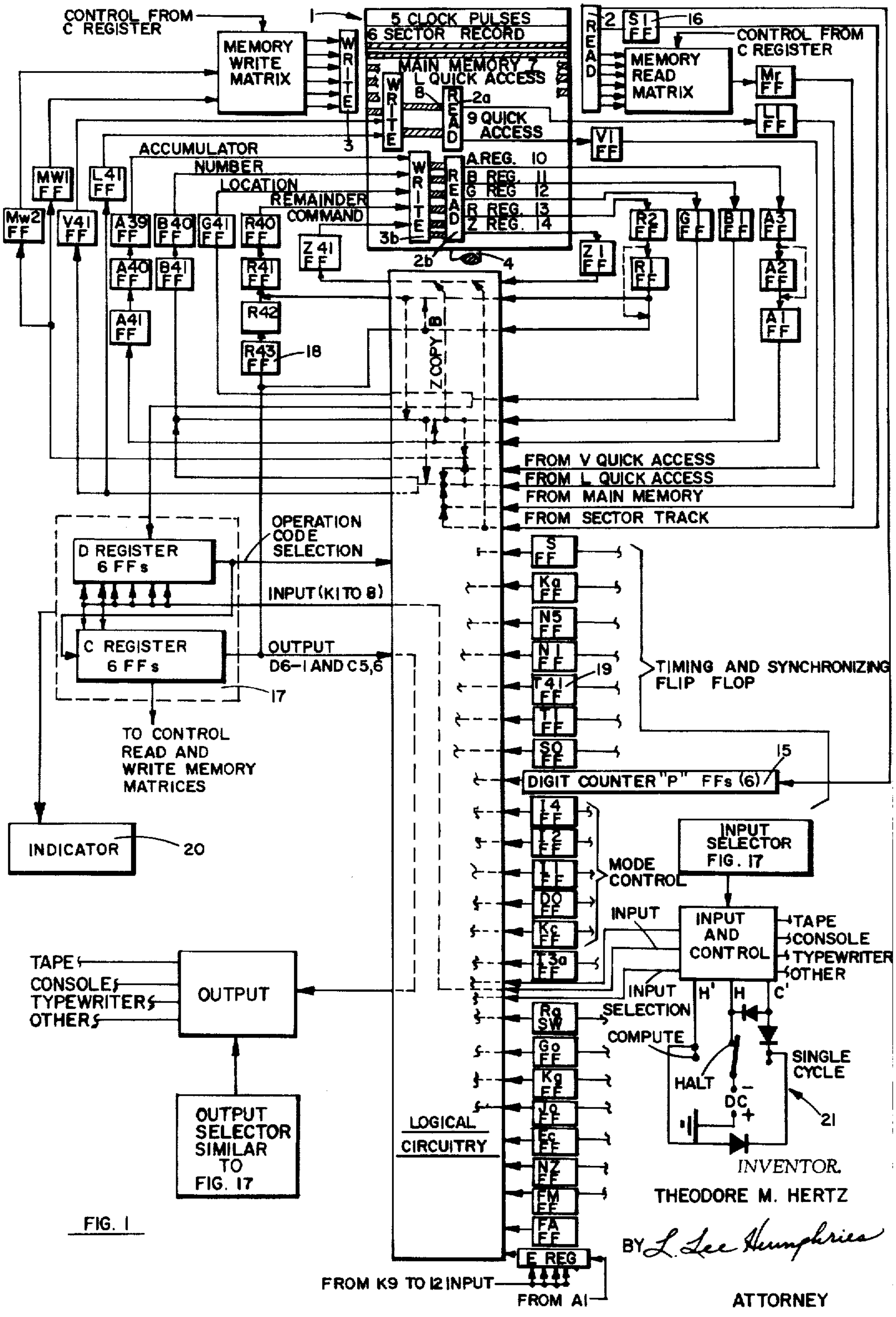

Referring to FIG. 1, an overall understanding of the computer may be gained. A magnetic drum 1 rotating on shaft 4 has several channels thereon adapted to be read by magnetic read heads such as 2, 2*a*, and 2*b*. It may be appreciated that this memory may be a magnetic disc, a drum, or even other memory devices may be used. In fact, it may be a static memory in which the input and output channels are utilized, or scanned, for recording or reading at the appropriate, indicated times, scanning in such instance being comparable to rotation or relative movement. The memory is comprised of two channels for synchronization, a first channel 5 having a continuous sine wave recorded therein to produce a pulse for each digit space as the memory rotates; and a record channel 6 for recording sector track information described in detail hereafter. Next, there are several additional channels 7 referred to hereinafter as the "main memory," a portion 8 of a channel which holds information and termed the L quick access loop and another portion 9 of a channel which holds information and termed the V quick access loop. These channels are read by read heads (indicated at 2, 2*a*, and 2*b*) and the particular channel is selected by the memory Read Matrix controlled by the C register. Referring to FIG. 14, it may be more clearly seen how flip flop M*r* is driven by a read power amplifier, M*a* to M*h*, selected by flip flops C6, C5, C4 in the C register. The inputs to the read power amplifiers are likewise controlled by flip flops C3, C2, C1.

The memory write matrix (in a store operation) is similarly operated and controlled by the C register.

Next on the magnetic drum, or disc, are the A, B, G, R, and Z registers 10, 11, 12, 13, and 14, respectively. Thus, it may be generally understood how the magnetic drum, or disc, may have 63 separate channels and each channel may be comprised of 64 sectors located end to end to form one complete channel. Each sector is comprised of 41 separate and distinguishable locations (digit spaces, or bit locations is sometimes referred to herein) in which a representation of a binary digit (bit) may be recorded. Each 41 bits recorded in a sector may be referred to as a "word." Essentially the computer solves problems by a succession of elemental steps of processing, or handling data either previously or subsequently transmitted into the computer.

In a binary system such as the one under consideration, many of the switching and storage devices exhibit two stable states. A bistable multivibrator, commonly called a "flip flop," is an example of a binary storage device, although others are known and used. Such a device is commonly known in the art and an exemplary design is set forth in FIG. 12. The two stable states of the flip flop are referred to as 1 and 0, set and reset, or also true and false, or even + and −. A low voltage (say, minus 12 volts) on one of the two output lines would represent 1 (termed "set") and if on the other, 0 (termed "reset"). The conditions 1 and 0 are mutually exclusive, that is, they cannot both exist at the same time. Inasmuch as these stable states are discrete, that is, readily distinguishable from each other, the system is termed "digital" as distinguished from "analog." Inasmuch as the flip flop has only two stable states, the system is referred to as "binary."

The computer is designed by causing its flip flops to be set or reset upon the existence of certain logical propositions. Such logical propositions are "mechanized" or fed to each flip flop by electrical circuitry utilizing "and" gates and "or" gates as illustrated for example in FIG. 13 wherein the C6 flip flop is set according to the states of various other flip flops in the computer, such as D6, P1, P2, and so on.

While the computer has certain elemental mathematical processes partly built into its wiring, additional instructions can be inserted to provide utilization or alteration of such processes. The operation instructed, of course, must be within the capability of the computer. The computer must be able to accept input data and operate upon it in accordance with instructions currently or previously received. Because even a simple multiplication problem, for example, may require several successive steps to be performed, all of which cannot be performed simultaneously, a memory or information storage system is required in order to proceed from one step or operation to the next, retaining the results (partial products and carry's, for example) of the previous step.

Various registers such as A, B, G, R, and Z and the other channels of the memory such as the L and V quick access loops and the main memory are utilized to hold information and to provide such information at the appropriate time. Information is routed from such locations into various routes to allow modification of the information which may then, of course, be stored for either successive steps or subsequent referral.

The unit group in which digits are handled in a computer is known as a word and in this invention, as stated previously, 41 bits form one word. It may be appreciated that words of greater or less length may be used in practicing the invention. One word equals in length and is stored in one sector of a channel. Most of the channels are capable of storing 64 words. Therefore, each such channel has 64 sectors. A shorter channel or channels of, say, 48 words may also be utilized.

Input and output to a computer may be by typewriter (modified appropriately), tape reader (magnetic, punched tape, or otherwise), or some other form of data transmission system such as console keyboard or, even, a wired, or wireless data transmission link. Output devices are similarly a typewriter, a tape recording system (tape punch, tape recording system) or numerical readout devices. The aforementioned devices are by no means inclusive and any number of adequate input and output devices may be devised to enter, feed, display or record the desired input and output information of a computer.

BIT TIMING

For timing, or synchronization, within the computer, and for identification of location on the magnetic recorder, channel 5, termed the "clock channel," has permanently recorded thereon sine waves to produce a pulse at each bit location. As each new bit position of clock channel 5 arrives under the clock read head a pulse is generated which is sent to digit counter 15, comprised of 6 "P" flip flops (P1 to P6) where it adds one additional count. The digit counter 15, which is a shift register, therefore, can always indicate the 41 bit locations, within the word, being read by all the other read heads 2, 2*a*, and 2*b* in the main memory, the registers, and the quick access loops. FIG. 7 illustrates in detail the successive settings of the six P flip flops.

Two special timing flip flops N1 and N5, whose logic and operation are illustrated in FIGS. 15 and 16, are utilized to denote specific portions of word times, such as bits 2 to 14, or 23 to 34, or 28 to 34.

SECTOR TIMING

It may be appreciated that, in addition to the location of each bit, each particular sector should be identified inasmuch as there are 64 separate sectors in most all of the channels.

In addition to the clock channel, therefore, there is a sector channel 6, called in this system "sector recorded track," which track includes information identifying the sector which will next arrive as well as various other information. Sectors are each numbered one higher than their own number so as to indicate the next sector which will arrive. For convenience the sectors are identified in octal form as shown in FIG. 6, the sectors being octally numbered 0 to 7, 10 to 17, 20 to 27, and so on, up to sector 77, which totals 64 sectors. The sector recorded track is a single track, as is the clock channel, and each sector has forty-one bits located therein. The sector track information is, of course, permanently recorded. As indicated in FIG. 6, the first bit to arrive at the sector read head, in sector No. 1, and each succeeding sector, is a sync indicator bit. The second bit to arrive is a half word indicator bit. The third, fourth, and fifth bits to arrive, together with the sixth, seventh, and eighth bits identify the next sector, which for convenience is expressed in octal numbers in the leftmost column of the figure. It is noted that the ninth, tenth, and eleventh bits in the sector track may be utilized to indicate various other information such as what input device is to be copied. The sector track may also set out an operation code to be followed by use of bit locations such as 15 to 20 or 35 to 40. Further explanation of the additional information contained in the sector recorded track will be found hereinafter.

The S1 flip flop illustrated at 16 in FIG. 1 reads the sector recorded track and indicates the information contained at each successive bit location on the sector track.

Referring to FIG. 7, it may be seen how the six P flip flops indicate each of the 41 bit locations within a word, or sector. Upon inspecting the figure, it will be noted that at various digit times the state of certain flip flops are immaterial. For example, at time 2 it is not necessary to determine the state of the P4 flip flop inasmuch as digit time T22 can be distinguished from T2 by the P6 flip flop. Going further, T18 may be distinguished from T14 by P6'P2 and P1'. It is noted that several gates T8, T13, T14, and T20 are developed for timing purposes and these gates together with selected P flip flops establish specific bit times. The logical equations for the setting of the P flip flops are also indicated in FIG. 7. Included in the timing system are two special digit time flip flops T1 and T41 which indicate these periods of times according to the logic also shown in FIG. 7. Special digit time flip flop T41 is initially set by the initial synchronization mode (S1I*q*I2) and thereafter it is set on the arrival of T40 as indicated by the P flip flops, as may be seen in FIG. 7. T41 is true during time T41 at which time it resets to 0.

During the next interval after time T41, T1 is set to 1 by T41, following which time it resets itself to 0.

It may be seen thus from the above flip flops that each bit within a word may be identified and located by the digit counter (P flip flops). As indicated in FIG. 1, the six P flip flops (digit counter 15) are connected to receive and count the pulses from the clock pulse channel in the memory. From the count in these flip flops and the sector recorded track flip flop S1, the computer has sufficient information to determine which exact bit and sector are under the read heads and write heads.

REGISTERS

In the computer are five recirculating loops or registers each containing one word (41 bits). The arithmetic registers comprise the A (accumulator) register, the R (remainder) register, and the B (number) register. The A register accumulates the results of any arithmetic operation and logical operations and, in addition, is utilized to receive input information and to provide output information. The R register (a lower accumulator register) stores the remainder in division or the least significant half of a product or dividend. It may be considered an extension of the A register. It allows carrying multiplication and division of places in addition to those in the A register. The Z (command) register contains the command being obeyed at a given time. The D and C registers also receive such commands.

Figure 1A:
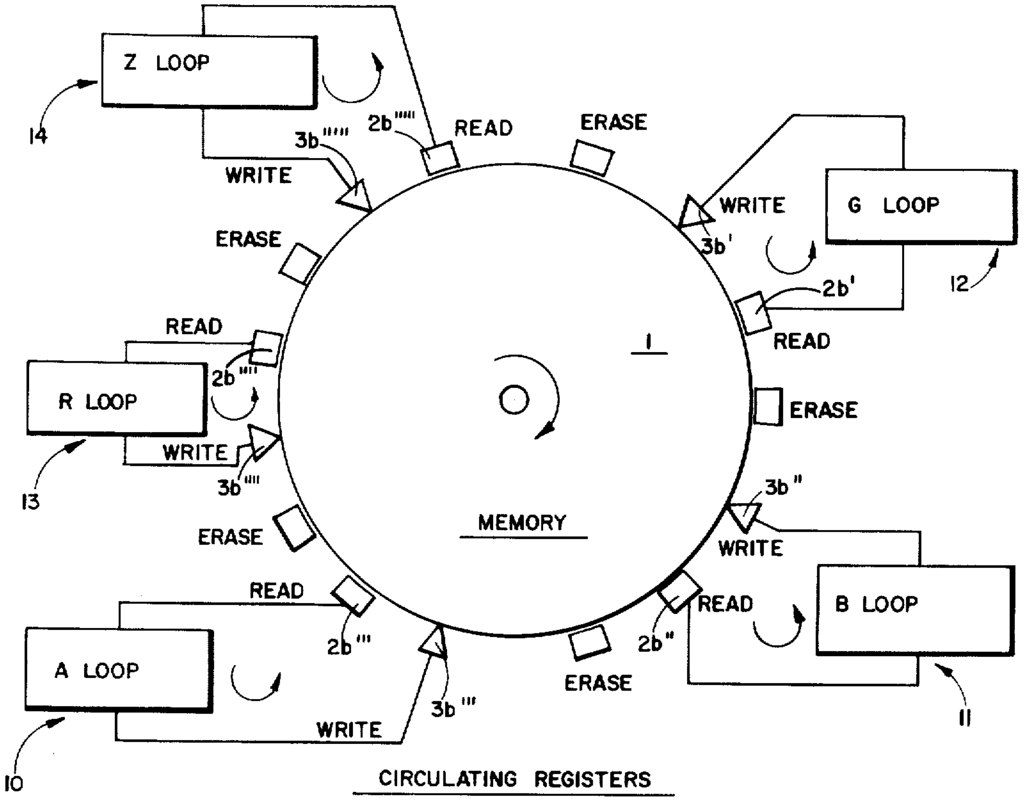
Figure 1B:
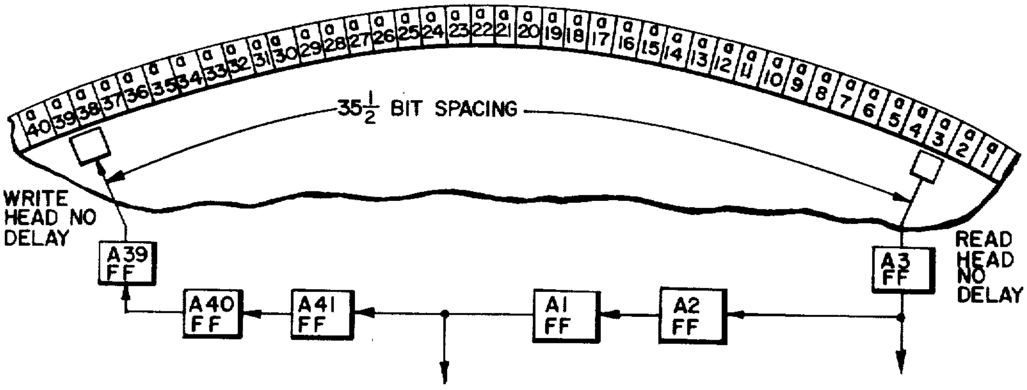

The B register holds the number or operand having the address specified in the Z (command) register. The G (location) register holds an address (of the current command to be utilized) and enables fast location of the correct address (and information at that address) in the memory. A portion of the G register includes an index register which, under programmed control, modifies addresses and controls the number of times a given set of instructions will be executed. It thus allows a set of instructions to be repeated using new data each time. Thus programming time is reduced considerably. These five one word registers may be located in separate channels or may all be in a single channel as shown in FIG. 1*a*, as may also the L and V quick access (eight word) loops. There should, of course, be utilized erase heads between each of the registers utilizing a common channel so that each register does not incorrectly affect the succeeding registers.

NUMERICAL WORDS

Figure 3:
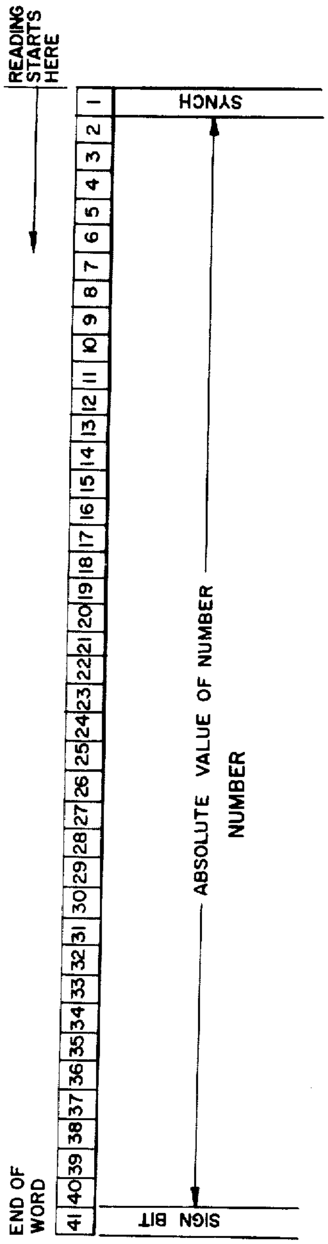
FIG. 3 is an illustration of a forty-one bit word, the unit by which data (either numerical data or instruction data) are handled within the computer. The word illustrated represents a "number" together with its sign (bit 41) and synchronizing bit (bit 1)

In the words utilized in the computer the far right bit (least significant) in each word (as shown in FIGS. 3 and 4) is used for synchronization and is not available for other usage. If the 41 bit word represents a number as in FIG. 3, the left most bit represents the sign (1 if plus, 0 if minus) of the number, followed then, of course, by the absolute value of the number. Normally, the computer assumes the binary point to be between the sign (bit 41) and the next most significant bit (bit 40). That is, numbers are considered to have an absolute value less than 1.

INSTRUCTION WORDS

On the other hand, the 41 bit word may represent an instruction as shown in FIG. 4. The instructions (sometimes called "commands") in this system are single address, that is, each instruction is comprised of an operation code, to be followed in carrying out the operation, together with a single channel and sector address designating where the data to be so operated upon will be found. FIG. 4 illustrates how the instructions are stored two to a word, one on the left hand and one on the right hand. There are, from the most significant bit (bit 41) a sign bit, an operation code of two octal digits (6 bits) and an address containing 4 octal digits (14 bits) plus a command bit which make up one command.

FIG. 4*a* illustrates in greater detail what information is contained within an instruction, or command. Bit 41 of the instruction word is utilized as the sign bit, bits 38, 39, and 40 indicate a first octal number (3 in the example shown) and bits 35, 36, 37 a second octal number (7 in the example shown). The two octal numbers indicated by these six bits determine the operation code, that is, the elemental operation (such as shift right, clear, transfer, copy, etc.) to be performed. The example shows operation code 37 which calls for clearing the A register and add the operand at the address specified by bits 23 to 34. Various other operation codes may be determined by reference to FIG. 11.

It will also be noted that the channel address and sector address of the information which will be used in performing the specified operation code, are determined by reference to bits 23 through 34 of the instruction of FIG. 4, which are indicative of an octal number comprised of four numbers such as 7251, illustrated in the example. The first two numbers 72 indicate the particular channel in which information will be found and the second two numbers 51 indicate the sector in that channel in which the information will be found. Lastly, bit 22, FIG. 5, if true means use the left 20 bits (22 through 41) at the address specified in bits 23 to 34 but if false use the right 20 bits at that location. The information found at the specified address may be numerical information (such as an operand for an arithmetic operation) or an instruction (such as a shift command, a read in or read out command, or other commands).

Thus it may be seen in an instruction that an operation may be specified and, further, an address may be specified to find the information upon which the operation is to be performed. In other words, the instruction contains the address of the word upon which the operation is to be performed rather than the word itself. This simplifies the substitution of data, allowing stored data to be changed without changing the instruction as to that data and vice versa. Computers using this principle are termed "single address" machines.

In the memory there are 63 channels each containing 64 words of information, and one channel, say, containing 48 words which comprise a 4080 word addressable main storage. This portion of the memory permits non-volatile information storage, meaning that the information stored under this condition is not subject to erasure unless erasure is desired. It will not be destroyed during power interruption or power cutoff condition. Words in the memory are addressed by four octal digits from 0000 to 7757. The first two digits indicate the channel of the memory and the last two digits denote the sector, or word, within the channel. In order to provide rapid access to some stored information when required, two high speed recirculation loops, L and V, of eight words each, see FIG. 1, are available in the programming. These loops have addresses which are indicated by octal numbers 7760 to 7767 and 7770 to 7777, respectively. The least significant digit specifies which of the eight words in the loop is addressed. Information in these loops is volatile and is subject to erasure during power interruption or power cutoff condition.

NOTATION

Figure 2:
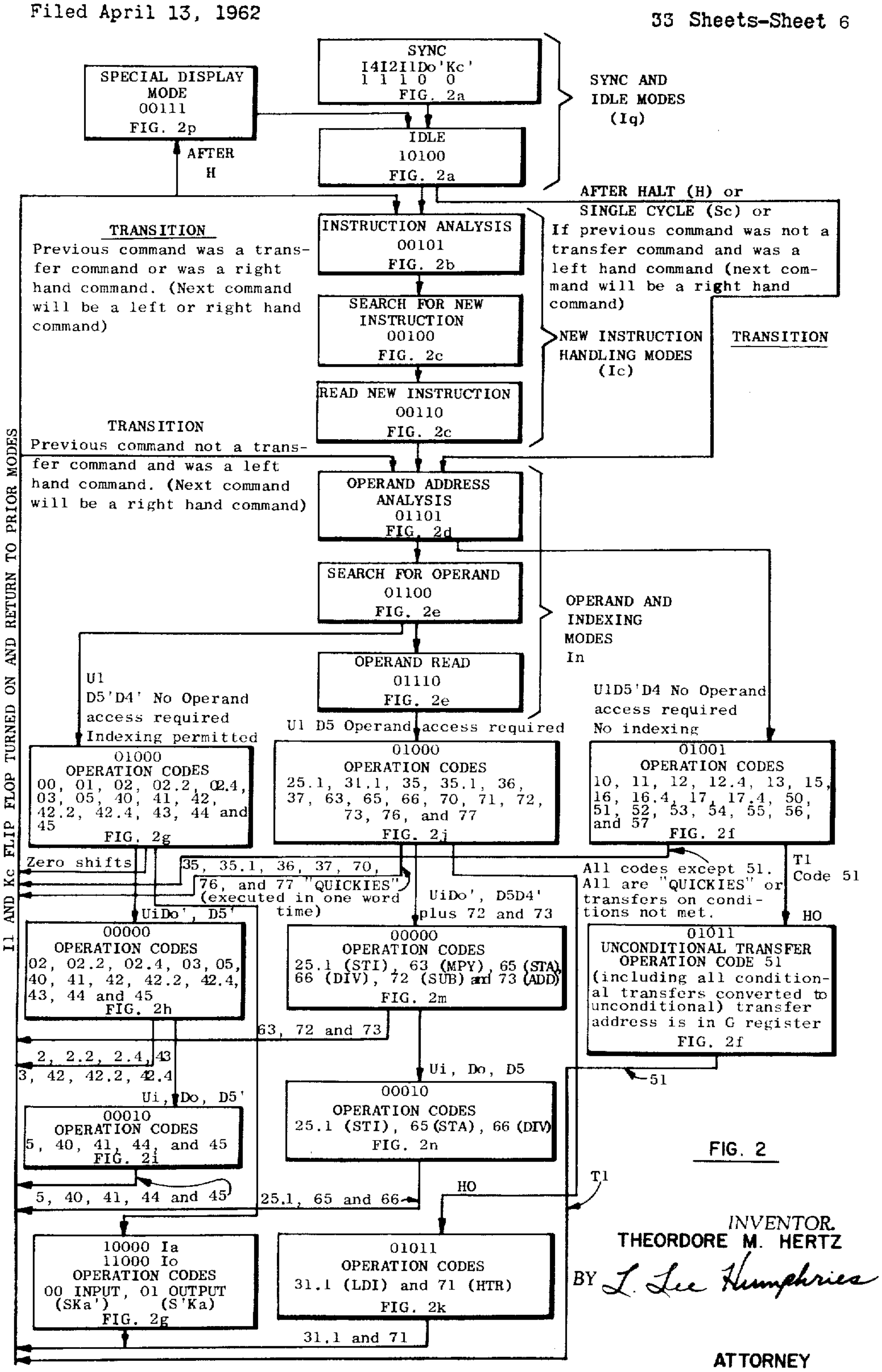

Referring to FIG. 2 there is set forth the various computer modes during which various flip flops are set in order to perform each of the steps to be carried out in each mode of the computer. The convention or notation system used is one commonly used in the computer art. For example, flip flop T41 is set to its 1, or true, state would be written 1*t*41. If set to its 0, or false, state would be written as *ot*41. These two states of a flip flop may also variously be termed as "set" and "reset," respectively. In writing a complete logical equation the notation is as follows as it might pertain to the setting or resetting of the T41 flip flop:

$$1t4 = T40 + S1IqI2$$
$$ot41 = T41$$

which translates as follows:

One set flip flop T41 upon the occurrence of T40 "or" S1 "and" I*q* "and" I2. Also, zero set flip flop T41 whenever it is true (this causes the T41 flip flop to remain set only for one interval, then it is reset). The "or" logic is signified by the plus sign (+), and the "and" logic is signified by the numbers and letters being located next to each other (or by an inferred multiplication sign as follows: S1×I*q*×I2. The electrical circuits providing "and" and "or" logical functions are well known as are the flip flops associated with binary devices. They will not be set forth in detail herein, other than the exemplary illustrations of FIGS. 12 and 13, inasmuch as their circuitry is not part of this invention.

A dash (—) indicates "don't care." For example, flip flops I4I2′I1D*o*K*c* may be represented as being set to 101—1. Each of the flip flops thus are set to 1 except I2 which is set to zero and D*o* as to whose setting it is immaterial, or "don't care."

Although not expressly indicated, all logical equations herein have a final term "C" which requires the clock pulse to arrive at the flip flops before any setting or resetting occurs. This permits synchronization throughout the computer and its registers so that flip flops will not be read while they are being changed. Referral to FIG. 13 provides an exemplary scheme for introducing the clock pulse to each flip flop. Other known gating methods may be used, of course.

A simplified form of notation is occasionally used in those situations in which one flip flop copies another. For example, rather than writing the following two equations to indicate Z41 is copying B1 under certain other conditions, $$1z41 = B1InKcGo'R42'$$
$$oz41 = B1'InKcGo'R42'$$

a single equation is used, for simplicity, as follows:

$$z41 = B1InKcGo'R42'$$

MODE CONTROL

In FIG. 1 may be seen that the various states of flip flops I4, I2, I1, D*o*, K*c* are designated mode control (to establish the mode in which the computer is operating).

Figure 2A:
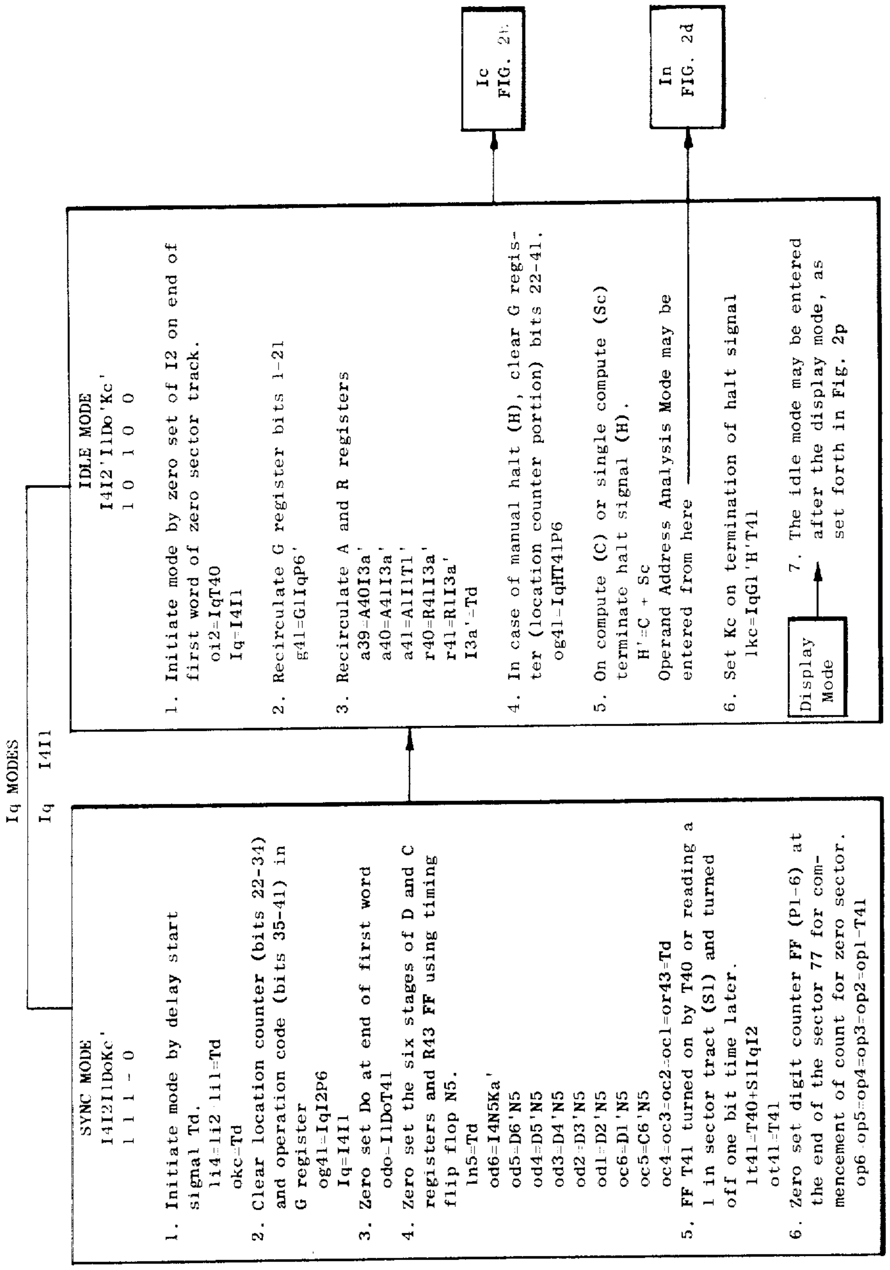
Figure 2B:
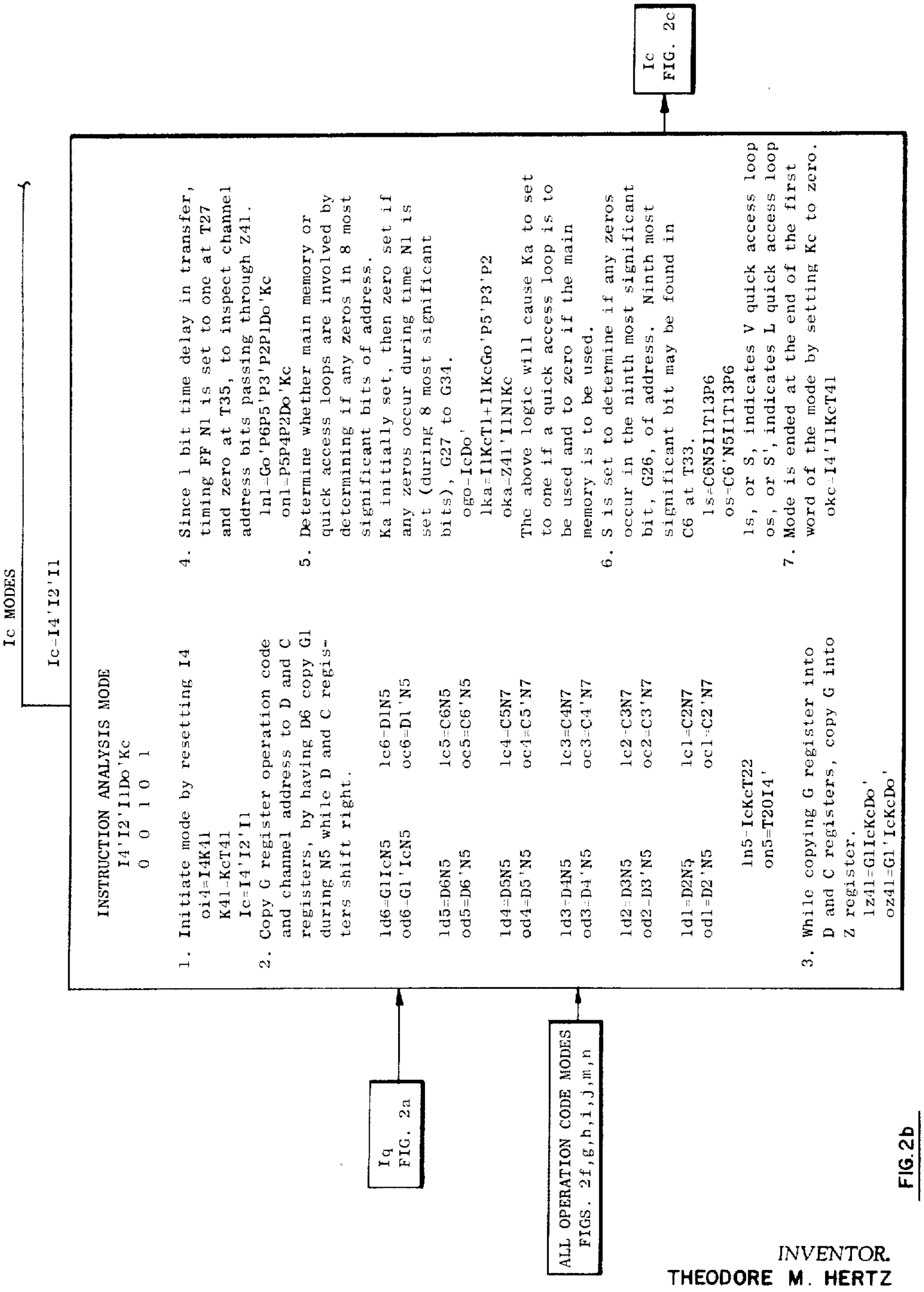

Referral to FIG. 2 will indicate the relationship between the various modes and how the setting of the various flip flops I4, I2, I1, D*o*, and K*c* establish such modes. FIGS. 2*a*, 2*b*, etc., set forth in greater detail the logic by which each of the mode control flip flops are set and reset in order to perform each of the steps to be carried out in each mode of the computer.

SYNC MODE

In FIG. 2*a*, a T*d* signal (generated by the computer shortly after the computer is first turned on) sets flip flops I4, I2, and I1 and resets the K*c* flip flop. The T*d* signal is called a delay start signal. The D*o* flip flop may be in either state as indicated by the dash but is zero at the end of the first word, at T41. The writing head for the G register records the information provided by flip flop G41 as shown in FIG. 1. The G register is set to zero in the sync mode upon the occurrence of P6 which from FIG. 7 may be noted to be during time intervals 22 through 41. This acts to clear the location counter of the G register, see FIG. 5, in its bits 22–41. In addition, the six flip flop stages of the D and C shift registers 17 together with the R43 flip flop 18 are all cleared, or zero set. Flip flop T41 (19) is set the time interval after T40 arrives and then resets itself to zero. It is, therefore, turned on for one bit time only, indicating T41 time.

The digit counter (15), comprised of flip flops P6 through P1, must be set so that it will start at zero at the beginning of the word and count through bits 1 through 41. This is accomplished by setting the flip flops to zero at T41. In the synchronizing mode, (I*q*I2) the digit counter flip flops (P6 through P1) can count to T40 only when there have been all zeros throughout the word, indicated by flip flop S1 remaining zero set, until T41 time. This can only occur in the sector preceding sector zero, as is shown in FIG. 6. Therefore, the P flip flops are not allowed to make a complete count through times 40 and 41 during the synchronizing mode until the zero sector arrives.

Sector 77 (the last sector) includes a binary 1 in its most significant position (during T41) so that the digit counter is set to zero at the beginning (T1) of the zero sector.

The sync mode is concluded at the end of the zero sector word when timing signal T40 is allowed to occur for the first time in the sync mode. The next mode, idle mode (I4I2′I1D*o*′K*c*′) is commenced by turning off flip flop I2 at time T40.

IDLE MODE

The idle mode (I4I2′I1D*o*′K*c*′) follows the synchronization mode but may also be entered from a special display mode (I4′I2′I1D*o*K*c*) shown in FIG. 2, after a programmed halt command, manual control signal (H), or single compute (S*c*) signal.

During this idle mode, the computer continues to recirculate information in the various registers A, B, and R, excluding the location counter information of the G register and information which may have been set during the halt command which caused the entering of the idle mode. To accomplish such recirculation G41 is set according to G1 during the P6′ bits (1 to 21). When a compute ($C = H'$, FIG. 1) or single compute ($Sc = H'C'$) command arrives, the idle mode is ended (by the halt signal (H) being terminated (H′)). Such logic can be seen by reference to the switch arrangement 21, FIG. 1.

The mode is then partially ended by K*c* being set on H′ and G1′. At this point the G1 flip flop is being used for a purpose additional to its customary usage. It is used to receive, possibly, an inhibiting signal from the program or external control. For the present it is noted that multiple use is made of the G1 flip flop not only as a location bit indicator but also as a halt flip flop. It had been previously cleared of information, therefore, it is readily used (momentarily) for such inhibiting control.

INSTRUCTION ANALYSIS MODE

The instruction analysis mode is commenced, FIG. 2*b*, by the setting of I4 flip flop to zero upon the K*c*T41 occurrence. This mode is one of the I*c* modes which are identified by I4 and I2 being set to zero and I1 being set to one (001 mode). During this mode the instruction address is analyzed to determine which memory is to be used (the main memory or the quick access, L or V, loops). In subsequent modes, the memory selected is searched until the address is located.

In order to analyze the instruction address, the G register, which contains the address of the new instruction, is copied serially into the flip flops of the shifting registers D and C by a timing control flip flop N5 by having D6 copy G1 during N5 while D and C registers shift right. FIG. 2*b*, by means of logical equations, illustrates the performance of these operations. FIG. 8 shows in somewhat flow diagram form the flow of information from the G register into the D and C registers. The G register is also, at this time, copied into the Z register using the Z41 flip flop copying the G1 flip flop. Bit 22 of the G register, see FIG. 5, indicates whether the left or right-hand instruction in the memory is to be used (the instructions being stored in pairs, the right hand being bits 2–20 and the left hand being bits 23–40 as illustrated in FIG. 4 and previously mentioned).

With respect to the G register, the channel address and the operation code are read serially into flip flop G1 from time T29 through T40. The G1 flip flop indicates each bit of the G register at successive time intervals. For example, G1 at T29 is bit 29 of the G register, see FIG. 9.

Bits 23–28 of the G register indicate the sector address and bits 29–34 indicate the channel (there being 63 channels). The sector address (bits 23–28) is not transferred at this time. Bits 35–40, as also shown in FIG. 5, represent an operation code of two octal digits (six bits).

To indicate whether the address ordered by the G register is in the main memory or in one of the quick access loops, a K*a* flip-flop is used. Since the G register is copied into the Z register, the Z register will be inspected during the appropriate time intervals to determine whether there are any zeroes in the eight most significant bits of the channel address (which denotes a main memory address, rather than an L or V loop address). Referring to FIG. 9, it can be seen that N1 does not receive information from the P register until T28 time, because of one bit time delay in the P counter. And **K*a* is not, therefore, allowed to respond until T29 time because of additional delay in N1. But since G27 has had to pass through two flip flops also (G1 and Z41**), also causing a two bit time delay, bit 27 (eighth most significant) and its eight following bits commence feeding into K*a* at T29 which inspects for zeros. Such time delays in setting flip flops must, of course, be taken into account in the flow of information within the computer. Since the addresses are 0000 octal (the binary representation in the G register being 000 000 000 000) through 7757 octal (binary being 111 111 101 111) are in the main memory and 7760 (111 111 110 000) through 7767 (111 111 110 111) are in the L quick access loop and 7770 (111 111 111 000) through 7777 (111 111 111 111) are in the V quick access loop, the K*a* flip flop will be set to zero (representing a main memory location) if any of the eight most significant bits in the G register are zero (bits 27–34). The K*a* flip flop is initially set to true by the logic illustrated in FIG. 2*b*.

Another flip fiop (S) can be set to the state of the ninth most significant bit (bit 26) in the G register to indicate whether a V quick access loop (S) or an L quick access loop address (S′) is indicated. Again, rather than refering to the G1 flip flop, we refer to information, say, in C6 (which the G register information reaches seven bit times later at T33) by taking into account the appropriate time delays.

Thus the instruction analysis mode is ended by setting the K*c* flip flop to zero at the end of the first word of the mode, at T41.

SEARCH FOR NEW INSTRUCTION MODE

Figure 2C:
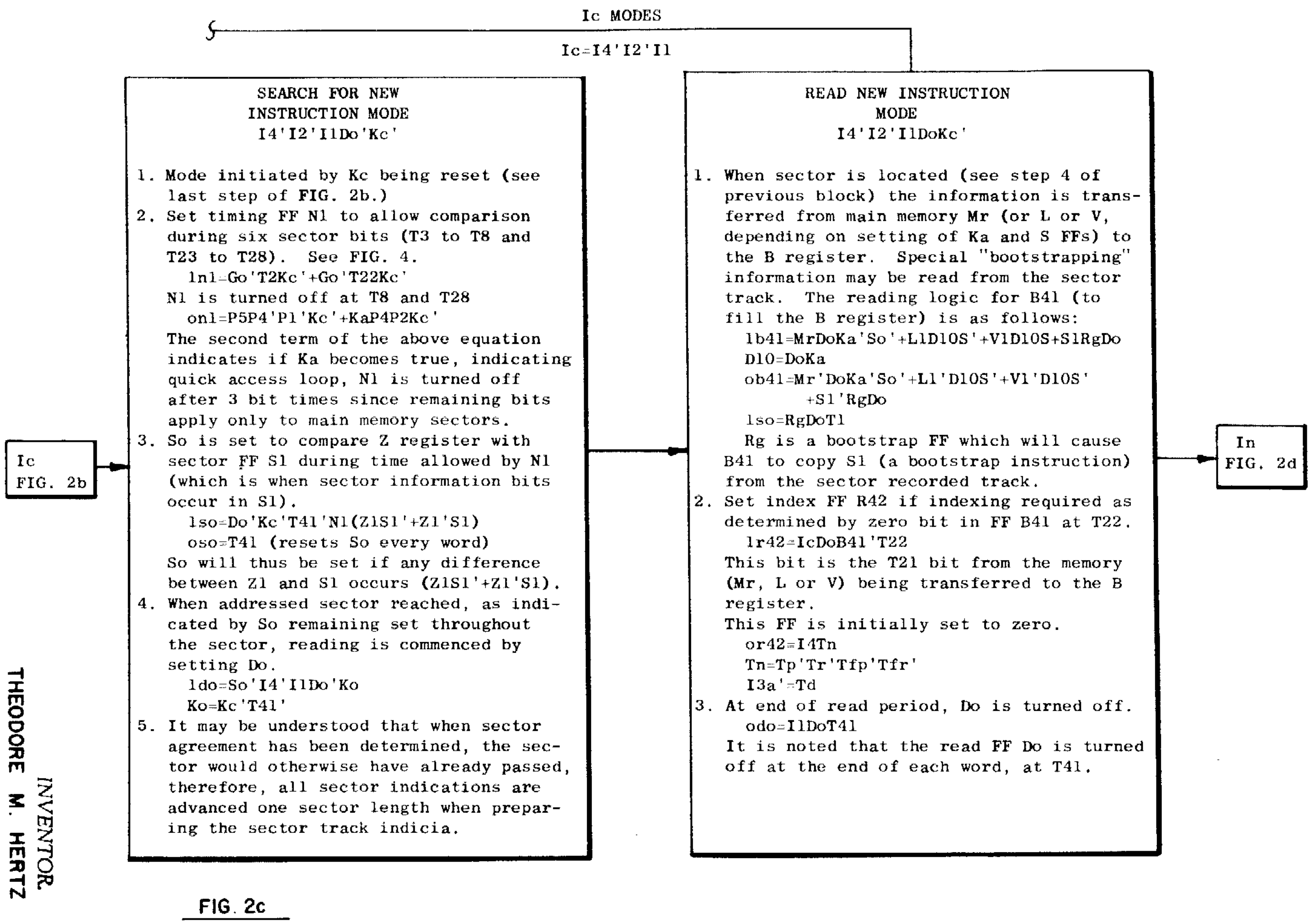

During this mode, FIG. 2*c*, the instruction search is made by comparing the sector address which was previously entered into the Z register with the sector track output flip flop (S1) during appropriate time intervals indicated by flip flop N1. Timing flip flop N1 allows such comparison to be made by the S*o* flip flop during the time intervals of T3 to T8 and T23 to T28, N1 being turned on at the beginning of those intervals and turned off at the end.

In accordance with the timing of the N1 flip flop, the sector flip flop S1 is compared with the Z1 flip flop by the S*o* flip flop according to certain logic to determine whether or not they are in agreement. The S*o* flip flop will be set if any difference between Z1 and S1 occurs.

When the addressed sector in the memory is reached, as indicated by S*o* remaining set to zero throughout the sector, reading is commenced by setting read flip flop D*o* (in the next mode, Read New Instruction).

It may be understood that when sector agreement has been determined, the sector has by that time passed and would otherwise be inaccessible, therefore, all sector indications are advanced one sector length when preparing the sector track indicia, as previously explained under "SECTOR TIMING," to permit adequate opportunity to remove or read information when the correct sector is reached.

READ NEW INSTRUCTION MODE

In FIG. 2*c*, when the sector has been located, the information is transferred from the memory (M*r*, L, or V, depending on the setting of the K*a* and S flip flops) to the B register. A special "bootstrapping" routine may allow certain information to be transferred from the sector track at this point.

Also during this mode if indexing is required, the R42 flip flop is set by an inspection of the T21 bit from the instruction being transferred from the memory to the B register. The T21 bit is found, however, at time T22 in B41.

At the end of the read period the read flip flop D*o* is turned off.

OPERAND ADDRESS ANALYSIS MODE

Flip flops K*c* and I2 are turned on to commence the operand address analysis mode, FIG. 2*d*. The K*a* and S flip flops are set, also to indicate whether a main memory or quick access loop is involved, as was done in the Instruction Analysis Mode.

The information in the B register (which was selected from the memory according to the original G register information which was transferred to the Z register) includes an address for channel and sector in its bits 3 to 14. This address contained in the B register may be modified, which is termed "indexing," by subtracting the index bits (bits 3 to 14) of the G register shown in FIG. 4 from the index, or address, bits 3 to 14 of the instruction in the B register. Whether or not indexing is required is determined by sensing the sign in bit position 21 of the memory information (detected in B41 at T22 time), and by setting flip flop R42 to its true state if indexing is required, otherwise leaving it in a preset false state. See the step (2) of the Read New Instruction Mode, FIG. 2*c*.

The contents of the B register (which may or may not have been modified, by subtraction, of the index information of the G register) is then transferred to the Z register during the first phase of the operand address analysis mode.

Thus the instant mode is utilized to transfer either the B register contents or the difference of the B register and the G register index bits to the Z register.

The pertinent logic for write flip flop Z41 to copy the B register if no indexing is required and the difference of the B and the G index bits if indexing is required during I*n*Do'K*c* in this operand address analysis mode is set forth in FIG. 2*d*. While it may appear that the index bits of these registers are added, the logic of the borrow flip flop R43 effectively causes the G register index bits to be subtracted from the B register index bits.

At the same time the Z register is copying the B register, the D and C registers also copy the B register. The left or right command from the B register is copied depending on bit 22 in the G register which indicates a left or right command.

The D and C registers can only hold 12 bits and, consequently, will indicate only a portion of the command (the channel address and the operation code transferred from the B register) which, of course, came from the memory at the address specified by the G register. The Z register contains the complete left or right command including the sector address, the command bit and the sign bit.

Referring to FIG. 2 it may be seen that if no operand access is required and indexing is not required (denoted by D5 being false and D4 being true) transition may be made directly from the operand address analysis mode to operation code state D5'D4 where the operation specified is executed. The operation codes are so numbered and segregated (see FIGS. 10 and 11) that (when the operation code is contained in the D register) the flip flop D5 will be false if no operand access is required and true if it is required. Flip flop D4, likewise, will indicate whether or not the operation specified is one which required indexing. For example, operation code 11, FIG. 10, TNZ instructs transfer if the number in the A register is not equal to zero. No operand access is required nor is indexing necessary. It can be seen D5=0 and D4=1.

If operand access is required or if the command specified indexing, the next phase (operand read mode) is entered.

SUMMARY

Figure 1C:
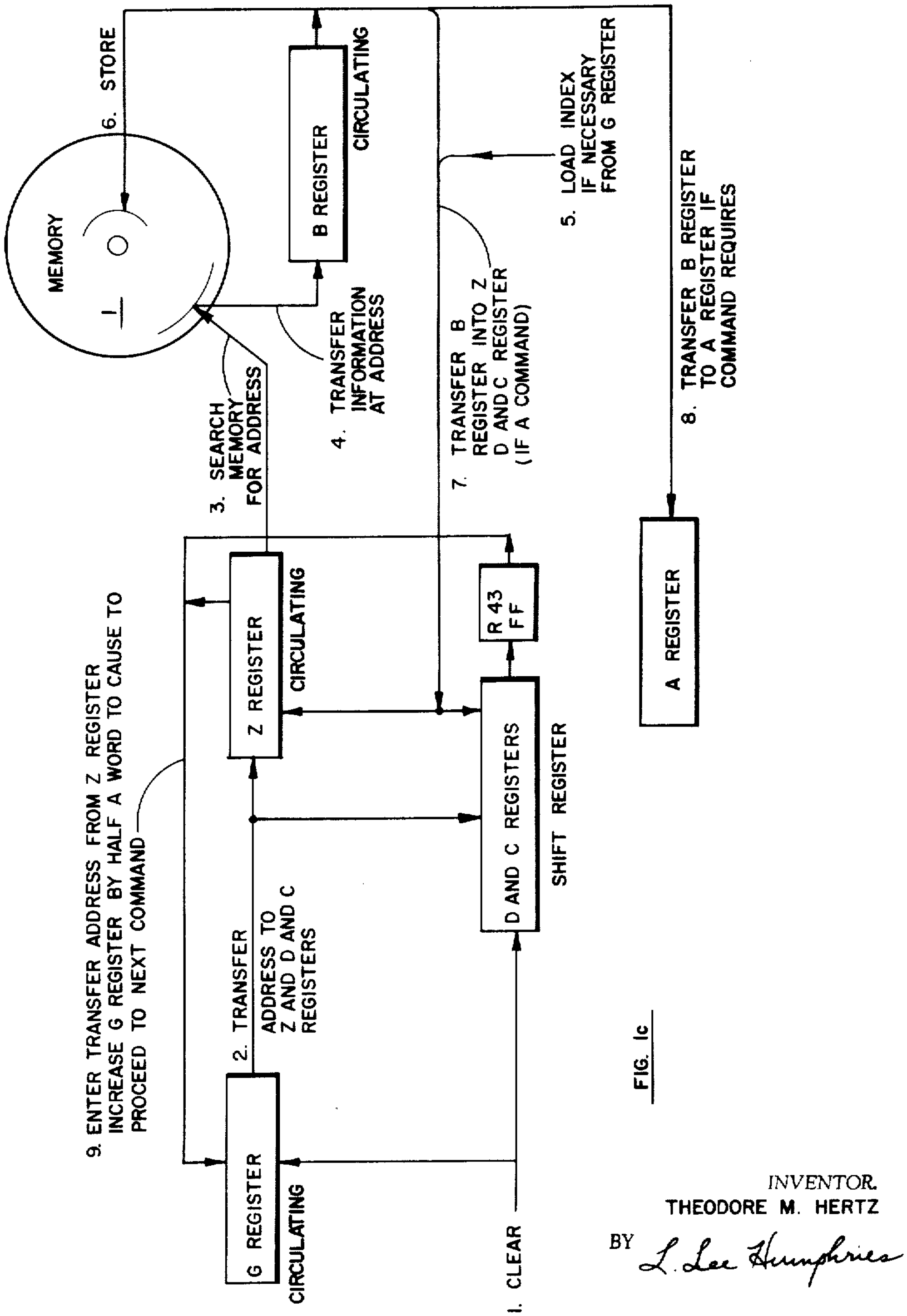

In review of what has happened thus far, referring to FIG. 1*c*, the G, D, and C registers are cleared and the digit counter (not shown) is set to zero and aligned with the zero sector track. The G register is copied into the Z register and the D and C registers. Using the Z register in comparison with the sector track flip flop, S1, the particular desired sector is located.

When the sector is located, the operand found there is transferred to the B register.

Thus we have the G register address information now in the D and C registers and also in the Z registers. The memory information at the address indicated by the G register has now been transferred from the memory to the B register.

Next, the B register left command or right command (indexed by G register index portion, if required) is transferred to the Z register. A portion of that same command (the channel address and operation code) are also transferred to the D and C registers. Inasmuch as there are only twelve flip flops in these registers, only 12 bits (9 to 20 or 29 to 40) can be held. The Z register, on the other hand, can hold all bits of the instruction 2 to 20 or 22 to 40).

Neon lights may be connected to indicate the states of each of the flip flops in the D and C registers and used in the console to visibly indicate the information contained in those registers. Such indicator is shown at 20 in FIG. 1. A neon light connected to visibly indicate the state of flip flop 43 may be used as a half word indicator to indicate bits of lower significance than those contained in the C register (e.g., half word indicator bit 21).

OPERATION MODE, NO OPERAND ACCESS OR INDEXING

This mode, FIG. 2, is entered directly from the Operand Address Analysis Mode, FIG. 2*d*, in those cases where flip flops D5 and D4 are zero and one, respectively, in the operand analysis mode, indicating no operand access is required and no indexing required. The operations (12, 12.4, 13, 16, 16.4, 17, 17.4, 54, 56, and 57) in this mode do not require indexing of the address and do not specify any operand access.

The operation codes covered by this mode (D5'D4) are illustrated in FIG. 2 and all operation codes are more fully explained in FIGS. 10 and 11. It is noted that operation codes 10, 11, 15, 50, 51, 52, 53, and 55 are transfer operations and, consequently, in order to know where to transfer to, the bits 3 to 14 or 23 to 34 of the word containing the transfer operation code are used to indicate the transfer address where the information is to be stored. See particularly FIG. 10.

The conditional transfers (such as 10, 11, etc.) are converted into the unconditional code 51 (TRA) at the end of the I*n* mode (I*n*T41) by determining when the condition is satisfied, and setting the flip flops in the D register to the operation code 51 (TRA) for unconditional transfer. Therefore, if the transfer condition is satisfied, unconditional transfer operation is specified and the H*o* mode condition is entered immediately (at T1) after U1(D5'D4) by setting D*o* to the true state.

The remaining operations in U1,D5'D4 are non-transfers and are generally termed "quickies" and are those which can be performed in one word time. Consequently, the K*c* flip flop is set at the end of the first word which returns the computer to either the New Instruction Handling Mode (I*c*) or the operand and Indexing Mode (I*n*), as explained hereinafter under Transitions.

In the "quickies" is also included conditional transfers where the condition is not satisfied (non-zero for TZE, no overflow for TOV, positive for TMI, lower order bit of zero for TLB, etc.).

If the command just completed is a left hand command and not a transfer (indicated by G*o*'), 12 is turned on as well as I1 to return to mode I*n*. Otherwise mode I*c* is returned to .

UNCONDITIONAL TRANSFER MODE

Operations code 51 (TRA) (where this includes all previous conditional transfers converted to unconditional during I*n*T41 as mentioned above) is effective in this mode to cause entry of the new transfer address into G41. This is accomplished by G41 copying Z1 during N5 for the left hand commands (G*o*') or by G41 copying R43 during N5 for right hand commands (G*o*). R43 receives such right hand command serially from C1 of the C shift register. It is noted that right hand commands, as well as left hand commands, are stored in the G register in a left hand location. To properly store a right hand command in the left hand location in the G register requires temporary storage of the command in flip flops D6 through 1 and C6 through 1 and R43 for an effective delay until the G register left command storage locations 22 to 34 arrive and recording may be accomplished therein.

It may be appreciated at this point an address in the Z register (received previously through the B register from the memory, for example) is transferred to the location counter portion of the G register.

Figure 2E:
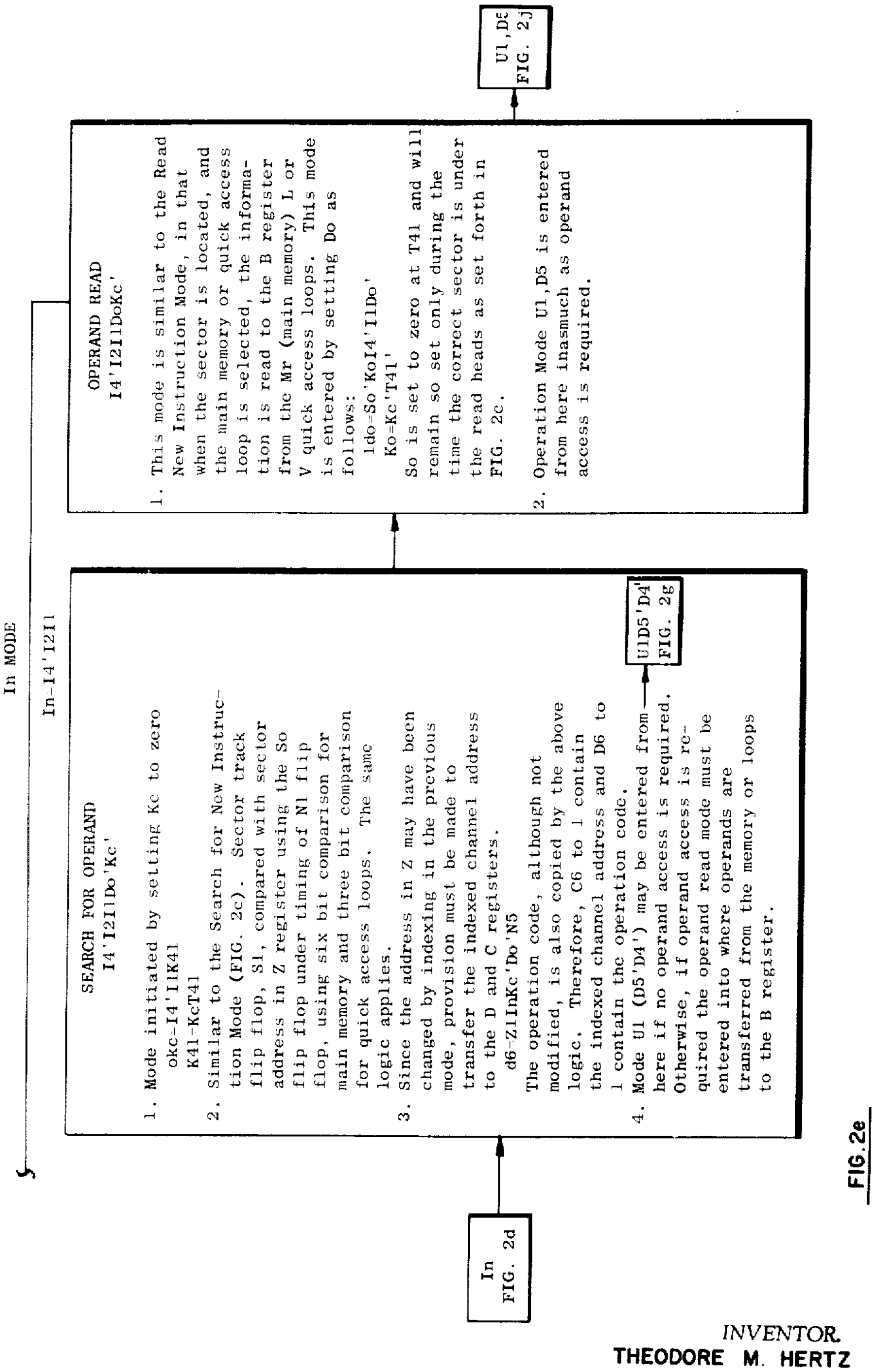
Figure 2F:
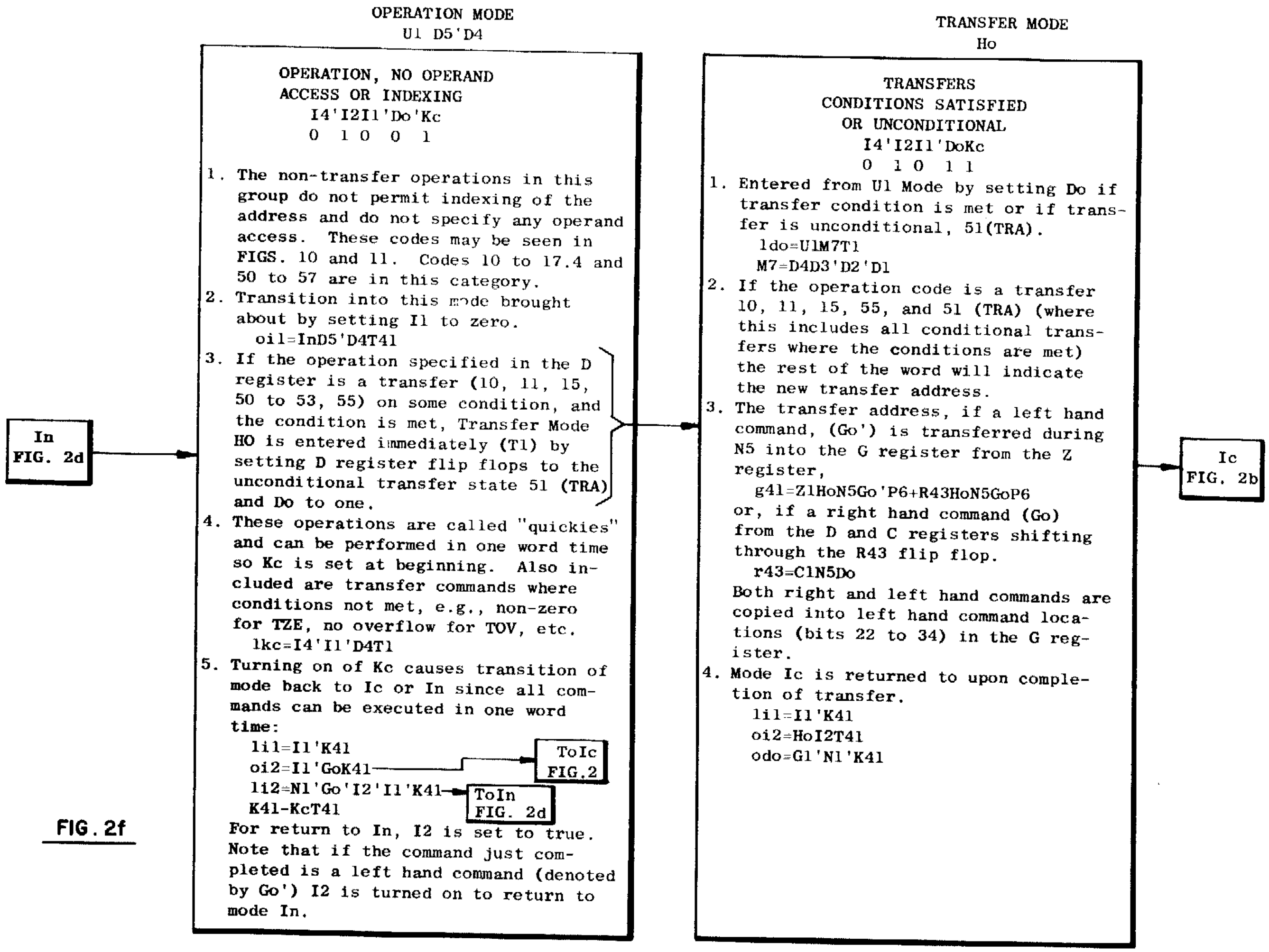

The transfer operation when completed brings on mode I*c* from the logic indicated in Step 4, mode H*o*, FIG. 2*f*.

SEARCH FOR OPERAND MODE

In FIG. 2, if in the operand Analysis Mode it is determined that operand access or indexing is required, the Search for Operand Mode is initiated by setting flip flop Kc to zero and the mode proceeds similarly to the Search for New Instruction Mode, FIG. 2c. The sector track comparison is made in order to locate the correct sector (indicated by the address in the Z register) as well as selection between the main memory and quick access loops. The same logic applies as in the previous search for new instruction mode.

It may be, however, that the Z register received an indexed address and provision must be made to correct the channel address indicated in the C register. Therefore, the Z register is again copied by the D register into the C register so the C register will contain the indexed channel address. The D register then contains the operation code.

An operation mode (U1, D5'D4') may be entered from here if flip flops D5 and D4 are both set to zero indicating no operand access is required; otherwise, the operand read mode will be entered at this point.

OPERATION MODE, NO OPERAND ACCESS, MAY REQUIRE INDEXING

This mode is operation code U1, D5'D4' and includes input and output commands, shifting commands, storing commands, and copy commands. Many of these operations specify indexing, possibly, but none of them require operand access. Thus the transition into this mode out of *In*, Search for Operand, occurs directly. Since these operations are not expected to be completed in one word as in the case of D5'D4 operations, flip flop Kc is not turned on. The operations in this group may, however, be terminated at the end of the first word where a shift is specified, for example, and the amount of the shift is zero; or where the shift is a normalizing one and left shift is to be performed until a binary 1 is detected in the most significant position, and this binary 1 is already in the desired position. In such cases, flip flop Kc is turned on before the end of the U1 mode so that flip flop I1 will be turned on by the condition KcT41 to transfer the computer back to modes Ic or In (to In if flip flop I2 remains on, it being turned off only if a right hand command was executed).

If input or output of information is required, special modes I*a* or I*o*, respectively, are entered by setting I4 at the end of the word. As seen in FIG. 2, if flip flop I2 is off, input is ordered (D4 being off). In those cases in which output is ordered, D4 is off and I2 is turned off.

A switch selector (illustrated in FIG. 17) is utilized to provide appropriate signals, I20, I21, I30, I31, I40, and I41, to the computer flip flops C4, C3, and C2 to prescribe the various computer input modes in which the computer is to operate. As shown, there are six possible positions of the switch, to set flip flops C4, C3 and C2 in various states depending upon their logic. If the source of −12 volts is connected to switch position 5, for example, I41, I30, and I21 lines have −12 volts on them, which represents a true proposition. If the source is connected to switch position 4, lines I40, I31, and I20 are true.

A switch identically wired may be used for the output modes, the outgoing connections to the C4, C3 and C2 flip flops being labeled O41, O40, O30, O31, O20, and O21.

For both input and output flip flops D6 through 1 and C6 through 5 are used to accomplish transfer eight bits at a time and to introduce an eight bit delay to shift the A register position so that each successive eight bits transferred to or from the computer represent lower place groups of digits. Thus, in input the first eight bits commence at the sign (most significant digit) and the succeeding seven most significant digits. Five such eight bit words from the input device complete one forty-one bit word (together with synchronizing bit 1) for the computer. The output operates similarly to transfer a forty bit word in eight bit units from the A register, starting at the most significant end and working down.

For both input and output the complements of bits 3 to 8 for right hand commands or 23 to 28 for left hand commands are transferred to bit positions 35 to 40 of the G register which is the character counter portion. Flip flop Kg, controlling the shift or complement operation of the G register, is controlled to count up until all binary 1's exist in the character counter portion of the G register. At this point the termination signal is generated by flip flop Kc. The cycle can go to twice the length permitted by six bits (64 characters) because the seventh bit remains in C1 after the entry during Ic or In and the turning on of Kc is prohibited if C1 is on.

Only five input words can be handled at a time during the usual input-output operation since this is the capacity of the A register. However, inasmuch as the computer can count to 128, high speed scanning of the input information is permitted, using the computer as a counter, it then retaining the last set of five characters which are scanned.

The turning on flip flop Kc for input or output causes the resetting of flip flop I4 and the turning on flip flop I1 to cause return to modes Ic or In, depending on whether it is a right or left hand command. It may be noted here again that the only difference between Ic or In return path is the action of flip flop I2 which is turned off when flip flop Go is true, indicating a right hand command has been completed.

It may be realized that an input or output command orders input or output of a certain number of characters, see FIG. 10, operation codes 00 and 01 where it is indicated that bits 3 to 9 or 23 to 29 will indicate the number of characters to be copied. The complement of this character number is transferred into the G register for both input and output operations. The information according to the equation illustrated in FIG. 2g, step 4, allows the G register to copy the complement of the D and C shift registers and circulate such information. The input and output character counter of the G register is controlled as set forth in steps 4 and 5 in FIG. 2g.

The input and output operation continues until flip flop Kc is set to 1 by the character counting logic as illustrated in steps 4 and 5.

Upon completion of the transfer of the desired number of characters indicated by Kc being set, the mode is terminated and the computer returns to the Ic or In mode.

In case of those codes which call for shifting (and more than zero shift is required), copying or storing, mode UiDo' (D5'D4') is entered under the mode U1. See FIG. 2. This transition is caused by zero setting I2, I4 of course remaining zero set.

OPERATION MODE, UiDo', (D5'D4') FOR SHIFTING, COPYING, OR STORING

The mode is entered from U1, D5'D4', and as stated above, provides shifting, copying and storing as shown in FIG. 2*h*.

Recalling that the computer is now operating under a command located in the command register, Z register, a part of which is also contained in the D and C registers, it may be appreciated that a normalizing operation may be ordered by the operation code portion of the command. Such normalizing is a left shift of the A register until a binary 1 appears in the most significant digit (or a left shift of the amount specified in the command). The shifting is terminated as soon as the binary 1 is detected in the S flip flop (forming a part of the A register in left shifting) at time T40. The number of shifts are counted in the G register.

If, on the other hand, a shifting operation is specified (operation codes 02, 03, 42, etc.) the Z register will also indicate the amount of shift, as a part of the instruction. To obtain the correct amount of shift, the G register copies the amount of shift indicated by the Z register (the copying being in complementary form) and then the G register is counted up until it overflows into C1, to indicate the shifting has been accomplished and shifting is terminated.

As to the storing or copying commands, sector identification is performed (in the manner previously explained) and when the correct sector is reached the storing or copying is carried out. With respect to storing, a slight modification of sector identification must be made by reason of the fact that the writing, or storing, heads are at an opposite point on the memory from the sector indicating flip flop. Reversal of the most significant sector bit by special logic driving the S*o* flip flop will correctly indicate, when the correct sector has arrived and storing may commence. See FIG. 2*h*, step 4.

OPERATION MODE U*i*D*o* (D5')

When the correct sector arrives, flip flop D*o* is set and mode U*i*D*o* is entered. This mode, FIG. 2*i*, accomplishes the storing and copying and terminates such operations by setting the flip flop K*c* at the end of the correct sector in which such storing or copying takes place.

OPERAND READ MODE

If during the search for operand mode it is indicated that operand access is required, the computer proceeds into the operand read mode, FIG. 2*e*. Whether or not operand access is required is indicated by D5 and the mode is entered by setting the read flip flop D*o*. Essentially, the mode is the same as the Read New Instruction Mode, FIG. 2*c*, in that when the memory channel and sector are located, the operand is read into the B register.

Operation mode U1, D5 is entered from this mode.

OPERATION MODE, U1, D5

This mode covers the operations where operand access is required. These operations are 25 to 37 and 63 to 77, FIGS. 10 and 11.

Figure 1D:
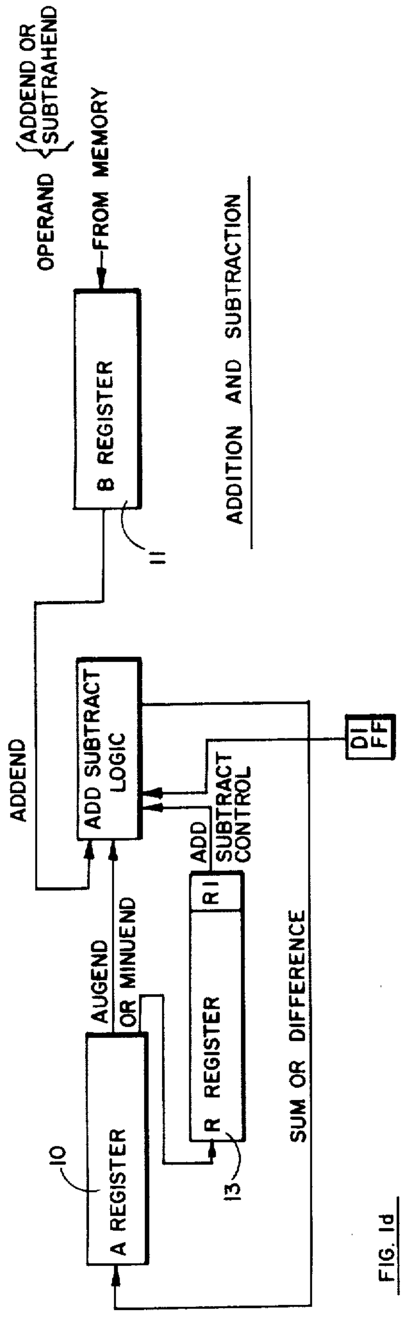
Figure 1E:
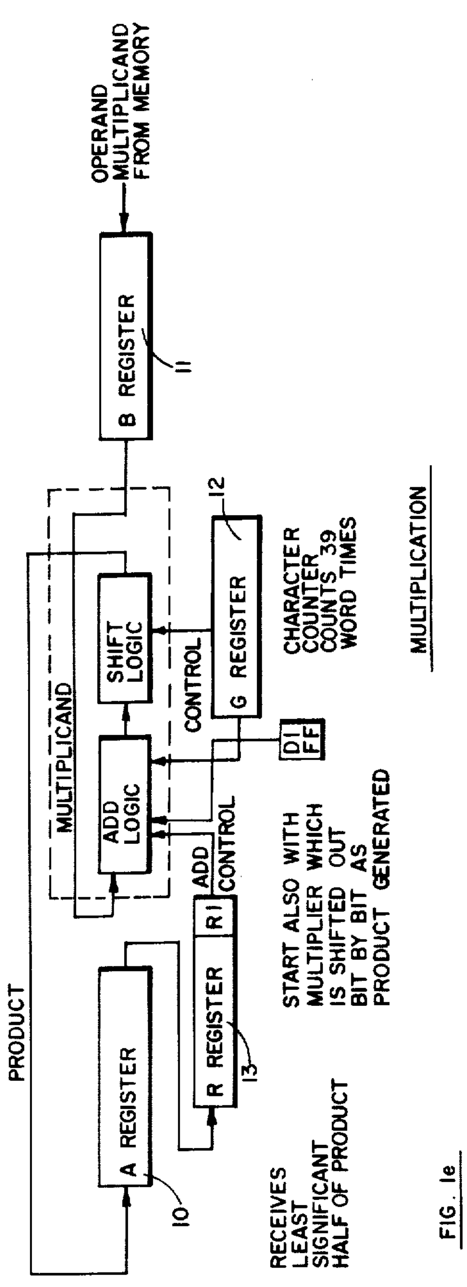
Figure 1F:
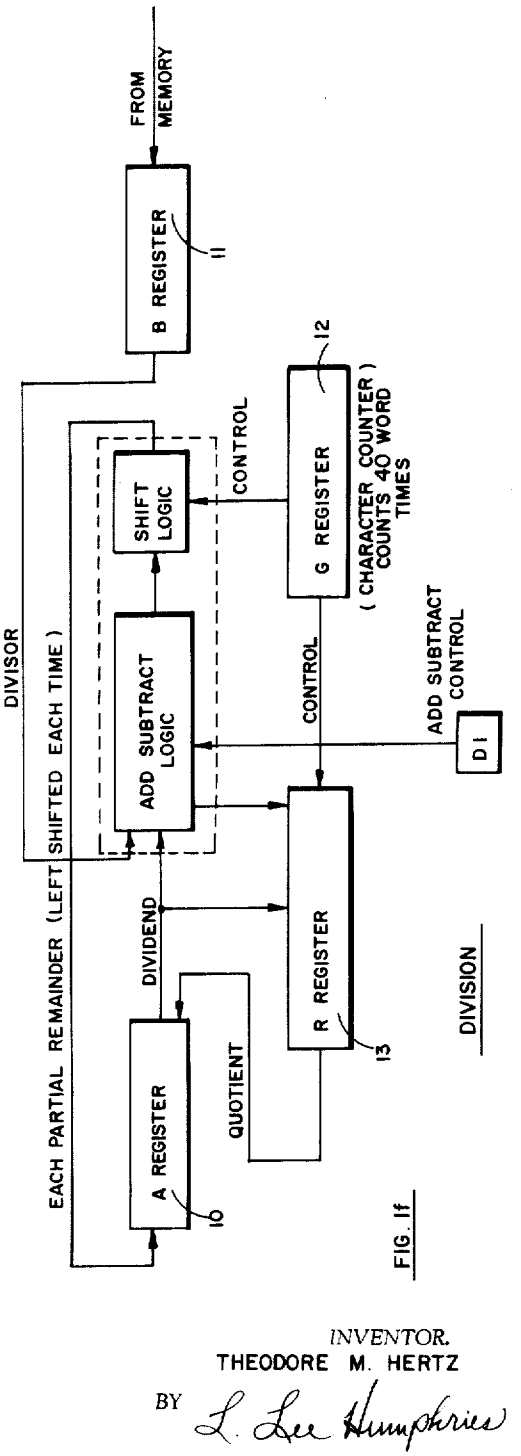

In general, operations requiring operand access are 63 (multiply), 66 (divide), 72 (subtract) and 73 (add). These operations are set forth in diagrammatic form in FIGS. 1*d*, 1*e*, and 1*f*, and illustrate the utilization of the A, B, and R registers in these operations. In FIG. 1*d*, illustrating addition and subtraction, the augend (or minuend) is contained in the A register 10 and is added to the B register 11. As the augend (or minuend) is added, it is shifted bit by bit out of the A register, and the sum is shifted in at the most significant end of the register. In multiplication, the R register holds the multiplier and the B register holds the multiplicand and the partial products are generated in the A register as is the final product. In division, the contents of the B register (divisor) is subtracted from the R register (dividend) and the difference (partial remainder) is written in the A register. The process again occurs until carried to the desired number of places. The quotient is developed bit by bit in the R register, the dividend in R being shifted left out of the R register, bit by bit, as it is used in the division process and as the quotient comes in, bit by bit.

Figure 2P:
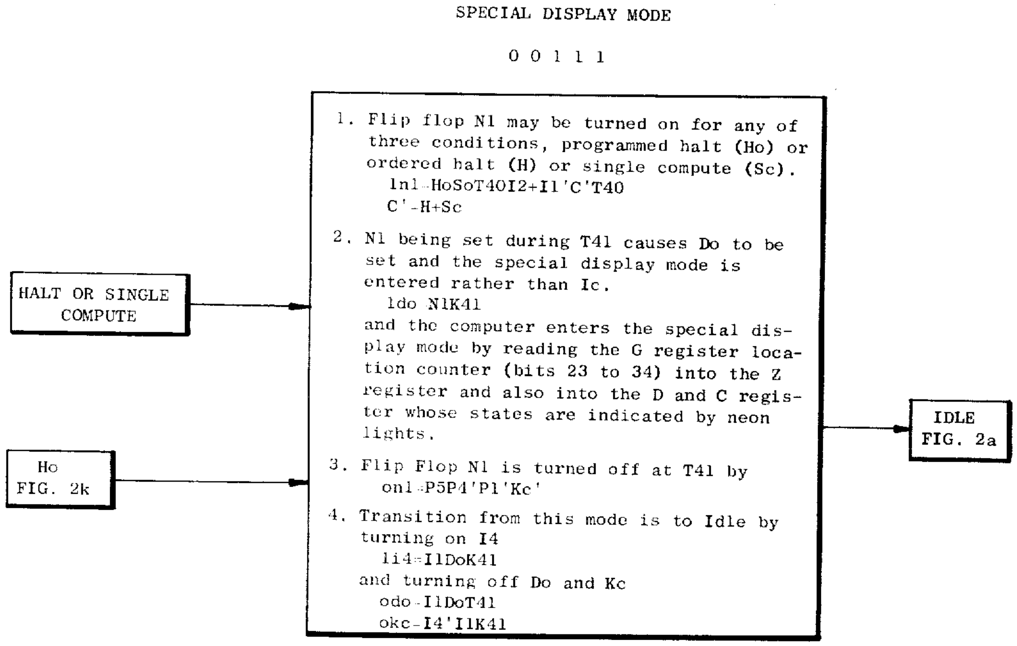
Figure 2I:
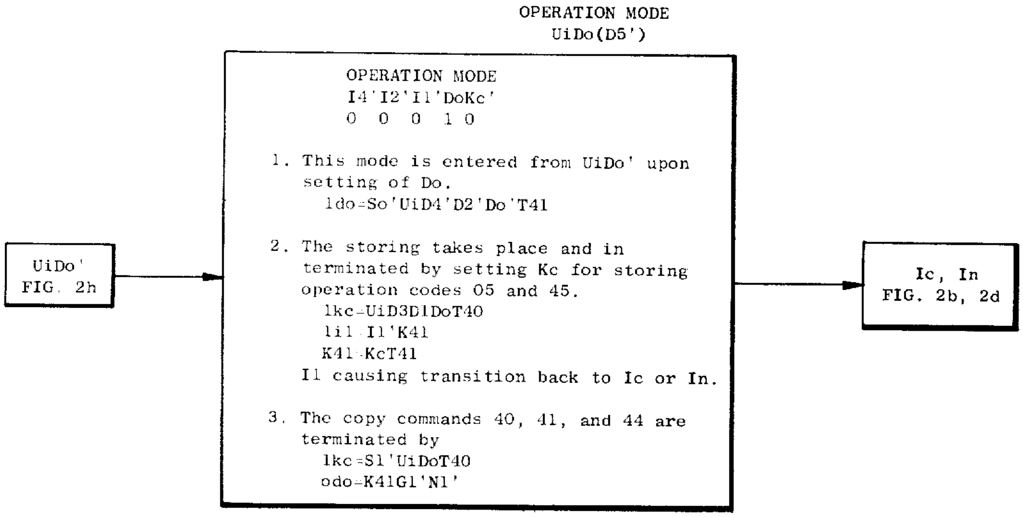
Figure 2J:
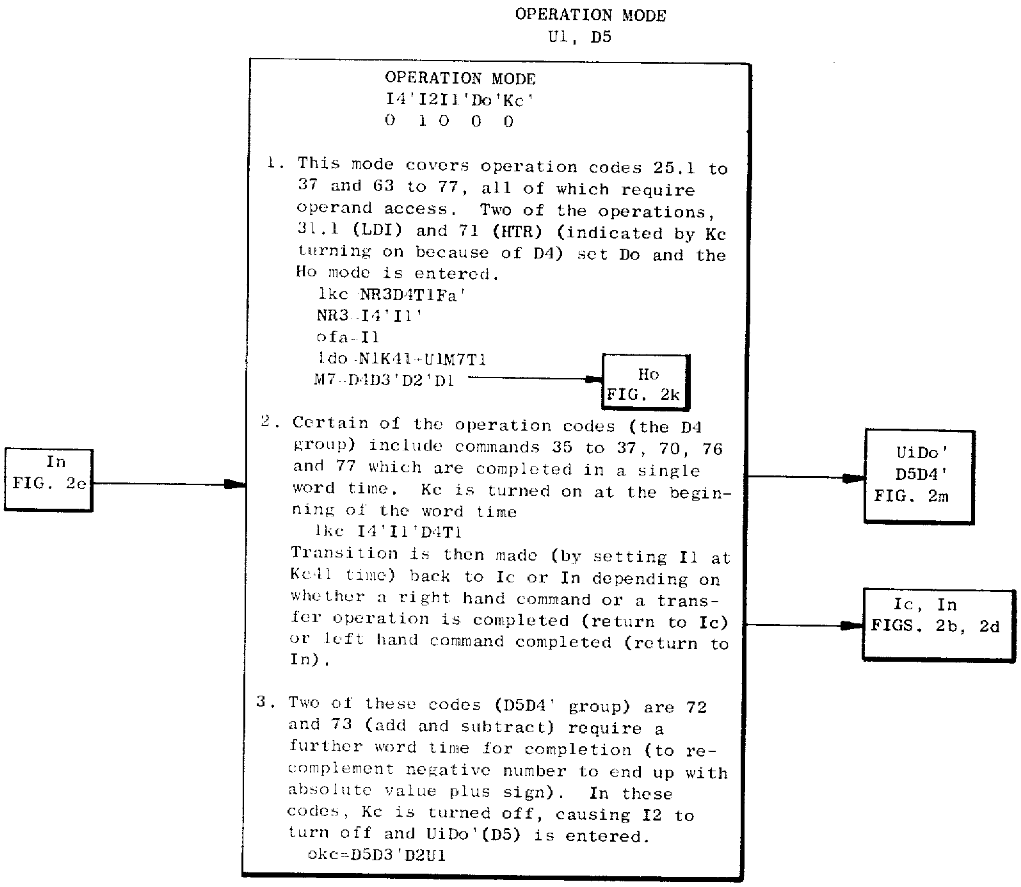

This mode, as illustrated in FIGS. 2 and 2*j*, covers operation codes, all of which require operand access. Two of the operations, 31.1 (read index from right hand portion of address to G41) and 71 (halt and transfer unconditionally), will cause the computer to enter the H*o* mode by setting flip flop D*o*.

OPERATION MODE H*o*

Figure 2K:
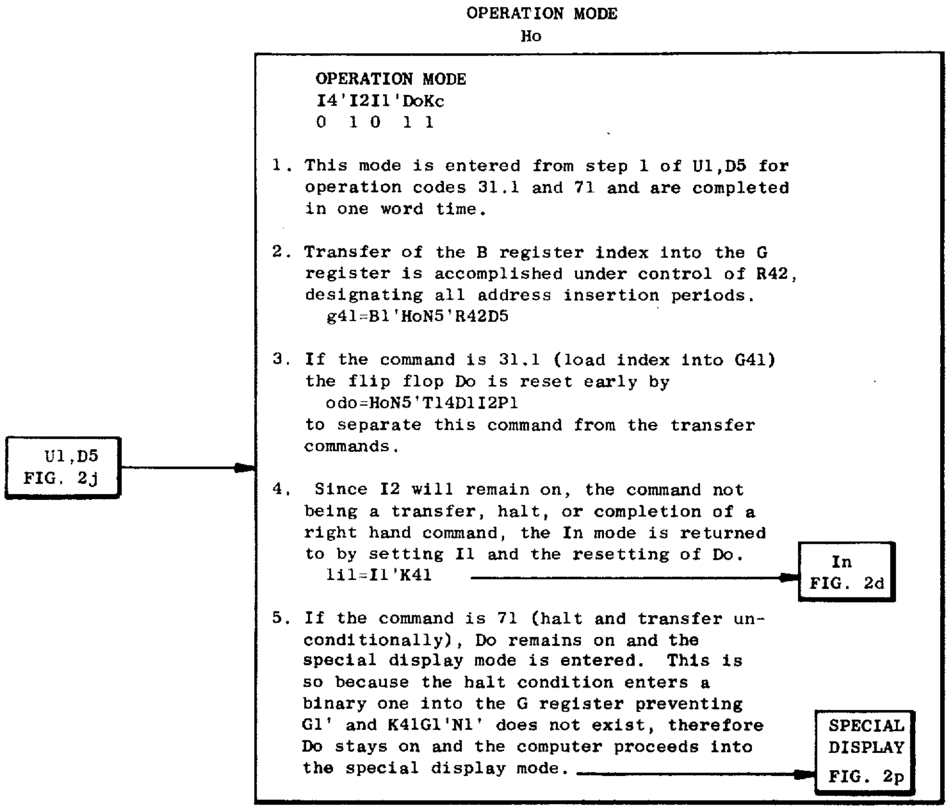

This mode, FIG. 2*k*, is entered from step 1 of U1, D5 for operation codes 31.1 (LDI) and 71 (HTR) and are completed in one word time. For 31.1 (LDI) transfer of the B register index (in complementary form) into the G register is accomplished under the control of R42 which designates the address insertion periods.

The mode I*n* is returned to from such operation.

If the command is 71 (halt and transfer unconditionally), the computer proceeds into the special display mode described hereinafter with respect to FIG. 2*p*.

OPERATION MODE U1, D5 (Continued)

If operation mode H*o* is not entered, as for example the commands being 35 to 37, 70, 76, and 77, which are also completed in a single word time, FIG. 2*j*, K*c* is turned on at the beginning of the word time. At the end of the word the computer transitions back to mode I*c* or I*n*, depending on whether a right hand command or a transfer operation is completed (in which case a return is made to I*c*) or if a left hand command has been completed, a return is made to I*n*.

Two of the codes, 72 (subtract operand specified from A register number) and 73 (add operand specified to A register number) require a further word time for completion and mode U*i*D*o*', D5 is entered.

OPERATION MODE U*i*D*o*', D5D4'

Figure 2M:
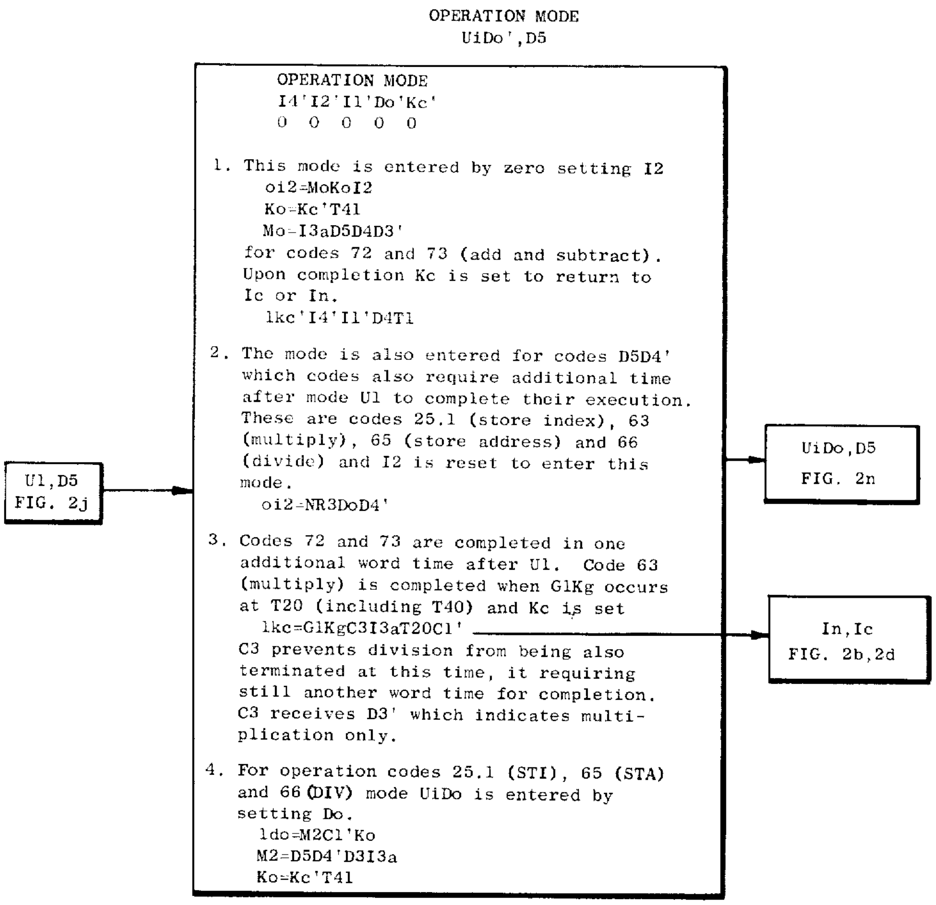
Figure 2Q:
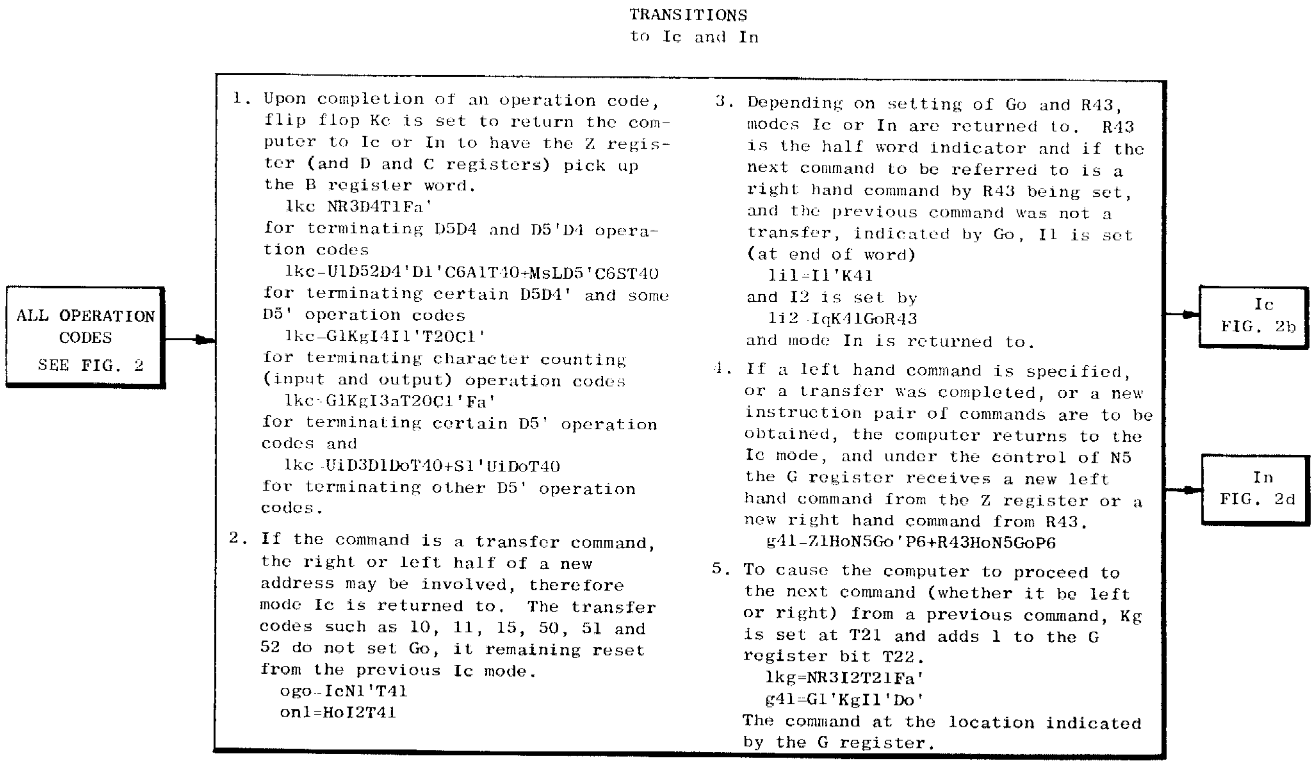

This mode, illustrated in FIG. 2*m*, is entered by zero setting flip flop I2 upon the codes 72 (sub) and 73 (add), although codes are not D4' codes.

The mode is also entered for codes D5D4' which require an additional word time over the U1 mode for their completion. Operation code 63 (multiply) is completed when **G1K*g* occurs and transition is made from such operation code as well as 72 and 73** back to I*n* or I*c* as indicated in previous transitions.

Three of the operation codes at this point, 25.1 (STI), 65 (STA), and 66 (DIV), require entering mode U*i*D*o* by setting flip flop D*o*.

OPERATION MODE, U*i*D*o*, D5

This mode is entered from U*i*D*o*', D5 in order to perform 25.1 (STI), 65 (STA), and 66 (DIV).

In performing 25.1 (store index address in right hand portion of the G register in the right hand at the address specified in the main memory) the index address in the G register is copied into the B register in recomplemented form for recirculation during U1 (recalling that the index was stored in G in complementary form). The remainder of the B register circulates without damage.

Upon a store command the contents of the B register are then sent (to the storage location specified) through flip flops M*w*1, M*w*2, seen in FIG. 1, to the main memory or flip flops L41 or V41 for the L and V loops.

Similarly, operation code 65 (STA) indicates that the address in the A register is to be stored in the address specified. The address from A is transferred to the B register from whence it is stored in the correct sector location in the memory.

In connection with the performance of operation code 66 (DIV), one word time is used in U1 and forty word times are utilized in **U*i***. Count of the word times is kept in the G register and when forty word times elapse, D*o* is set and K*c* terminates the mode to return the computer to I*n* or I*c*.

The computer may also be programmed to receive input information and to provide output information.

INPUT AND OUTPUT

The input device enters information via eight input lines (as shown in FIG. 1) into the input-output register D6 through 1 and C6 and C5 and from these registers accumulates eight bits at a time in the A register. During the input period P*m* (I4I2'I1'S), the D register, D6 through 1, and two flip flops of the C register (C6 and C5) copy lines K8 through 1 from the input device.

For both input and output, D6 through 1 and C6 and 5 are used to accomplish the eight bit transfer and to introduce an eight bit delay to shift the A register position so that each successive eight bits transferred to or from the computer represent succeedingly lower significant groups of digits. Thus in ICH (input) the first eight bits entered into the D and C registers and thence to the A register would be the sign at the left end and the seven most significant digits, with successive eight bit entries filling in the A register eight bits at a time to the right. Five eight bit entries in this manner are required to complete one word in the A register.

The logic is as follows for transferring information from the D and C shift registers into the A register:

$$a41 = C5N6$$
$$N6 = I4N5I1'$$

Output operates in a similar manner, to transfer eight bits at a time from the A register starting with the most significant portion and working down.

The code for ouput, OCH, causes information from the A register to be fed into the D flip flops, including the C flip flops 5 and 6, from which flip flops, output may be taken directly to control an output device.

TRANSITIONS

From FIG. 2 it may be seen that upon the completion of an operation code, a transition is made back to pick up the next command to be carried out. Such transition takes the computer back to either Instruction Analysis, I*c*, to pick up the next pair of commands or else to Operand Analysis, I*n*, to act on the right hand command. The location counter in the G register is augmented by one (bit 22) to increase its count so as to denote the next command. This next command is obtained, as before, by the Z register receiving the new location address from the G register, having the B register copy the command at that location. The command is then shifted to the Z register (and D and C registers for performance).

Inasmuch as commands are stored in pairs (a left and a right command), in the usual course of events left command will be performed, and the computer will return to mode I*n*, subsequently, and pick up a right hand command. To return to a right hand command, after a left hand command, provision is made to increase the location counter in the G register by a half a word (by turning bit 22 true). If a left hand command is the next command, the G register is increased by adding another one to bit 22, causing it to carry to bit 23 which will indicate to the computer to pick up the next command pair.

Bit 22 in an instruction indicates, if true, perform the right hand command; if false, perform the left hand command.

Referring to FIG. 4, the right hand command is copied first from the number register B into the command register Z and the D and C registers) but if bit 22 in the G register is false (indicated by R43 being false) the right hand command is replaced in the Z register (and D and C registers) by the left hand command. If, however, the right hand command was indicated (bit 22 in the G register being true) the left hand command term N5 is inhibited and the right hand command utilized. See step 3 of FIG. 2*d*. Flip flop I2 is set in such situations to cause the computer to return to I*n*, FIG. 2, to pick up a right hand command.

The two flip flops controlling the setting of I2 are G*o* and R43. R43 is the half word indicator and if true indicates that the next command is to be a right hand command. This by itself is not sufficient to turn I2 on (in order to proceed into mode I*n*) but the state of flip flop G*o* is also determined in order to detect whether or not the last command was a transfer command. Transfer commands are those such as 10, 11, 15, 50, 51, and 52 which require the computer to pick up the next command (right or left) from the address specified. Therefore, the computer also returns to the I*c* mode upon such transfer commands.

In summary, if the condition G*o*R43 is true, the next command to be executed is a right hand command and the previous command which was executed was not a transfer command and the computer returns to mode *In*.

SPECIAL DISPLAY MODE FOR HALT AND SINGLE CYCLE

In some operations or programs a halt signal will be generated by the computer. The N1 flip flop is utilized to denote a halt. If the N1 flip flop turns on at time 40, it denotes such halt and takes the computer into the special display mode wherein the G register location counter bits (23 to 34) are copied into the D and C registers whose states are indicated by the neon lights of indicator 20.

$$1n1 = HoSoT404I2$$
$$Ho = I1'DoI3a'$$

Such a halt is termed a "programmed halt" command. The operator may order a halt which also leads into such special display mode $$1n1 = I1'C'T40$$

The operator may order either a halt defined by the switch signal H or a signal defined by the switch signal S*c* in FIG. 1. Either of these signals is effective to start the half sequence which includes generating of the N1 stop bit (at T40) which is entered into the G register. Flip flop N1 is turned off at T41 time by the logic P5P4'P1'K*c*'.

The halt command may have occurred, thus, it may be realized, from operation code 71 (halt and transfer unconditionally) or a manual signal.

Referring to FIG. 2 it will be recalled that after completion of the special display mode identified by code 00111, flip flop I4 is turned on, D*o* and K*c* are turned off, which causes the computer to enter the idle mode from which there are two possible transitions, either into I*c* or I*n*, depending again on whether the previous command was not a transfer command and was a left-hand command (in which event I*n* is entered), meaning that a right-hand command is to follow.

SUMMARY

It may be appreciated, referring to FIG. 2, that a system for a computer operating in all its various modes (including the carrying out of arithmetical functions, synchronization, idle, search, transfer, or other functions) has been set forth, and detailed information has been provided indicating logic and structure for accomplishing such purposes and functions. The computer thus provided is capable of following an instruction or a successive series of instructions which are introduced, including those which have been stored in the memory, some of which are possibly permanently stored, as in the unused portion of the sector track, for example.

Understanding that a computer undertakes the performance of its operation by means of accomplishment of elemental steps (such as denoted by operation codes set forth in FIG. 11), the various modes are herewith illustrated whereby a minimum number of flip flops enter the computer into specific modes for carrying out selected ones of such elemental steps, enabling the computer to perform such steps in minimum time and with the minimum number of operations.

It may be noted from FIG. 2 that a Sync Mode is followed by an Idle Mode, which in turn is followed by either an Instruction Search or Operand Search Mode, and a Read Mode. Subsequently, any one of three Operation Code Modes U1 are entered, and for those operations requiring only one word time, transition is made back to an Analysis Mode for the next command. As to those operations requiring additional word times, the computer enters mode U*i*D*o*' and possibly mode U*i*D*o*.

In the operation code modes, the modes defined as U1 modes (see FIG. 2 and FIGS. 2*g*, 2*j*, and 2*f*) are those in which I4I2I1 and D*o* are set to 0100 respectively and K*c* may be true or false.

LOGICAL EQUATIONS, SYMBOLS AND SPECIAL GATES

The logical equations, symbols and special gates for the computer operating in the manner of the invention, are set forth below. The computer incorporates approximately sixty flip flops (bistable multivibrators or some other suitable bistable device) whose states are determined in accordance with the logical propositions set forth in the equations. The symbols used are explained previously herein under "Notation." For brevity and clarity, several symbols are used to indicate the settings of two or more flip flops. Such symbols and their meanings are set forth. In addition, there are constructed several special gates operated according to the existence of two or more conditions. Various flip flips, such as G1, Z1, B1, and A3 do not appear in the logical equations inasmuch as they are driven directly by memory read heads or amplifiers.

The Rg switch in FIG. 1 is depressed by the operator and, while depressed, provides a signal of a given D.-C. voltage within the computer just as does a flip flop. Therefore, it may be considered to be a flip flop which is "set" so long as the operator depresses it and reset when he ceases. The Rg flip flop as set forth in step 1, FIG. 2*c* of Read New Instruction Mode, indicates when the B register is to copy the sector recorded track for "bootstrapping" the computer into operation.

LOGICAL EQUATIONS FOR FLIP FLOPS

*N1*

$1n1=P6'P5'P3'P2P1KcDo'I1+Go'P6P5'P3'P2P1KcDo'+HoSoT40I2+GoT2Kc'+Go'T22Kc'+I1'C'T40$ $on1=P5P4'P1'Kc'+KaP4P2Kc'+WsP2P1+KcP5P4P2Do'+HoI2T41$

*So*

$1so=Kc'Do'Z1S1'N1T41'+Kc'Do'Z1'S1N1T41'+A1InKcT41'T1'+InD5'D4'T1Kc'+Z1S1WsT8+Z1'S1'WsT8+RgDoT1+Z1S1WsT28+Z1'S1'WsT28+HoD6D5T2$ $oso=T41$

*G41* Write $1g41=G1Kg'T41'+G1'KgI1'Do'+Z1HoN5Go'P6+C1'InKgDo'+N1T41P6+G1IqP6'+R43HoN5GoP6+DoKgT14P1'D6+G1H'T41I1+B1'HoN5'R42D5+DoKgT20D6'$ $og41=G1'Kg'T41'+G1KgI1'Do'+Z1'HoN5Go'P6+DoKgP5P4P3'P2+B1HoN5'R42D5+R43'HoN5GoP6+C1InKgDo'+G1'Iq+IqI2P6+DoKgT20D6+G1'N1'T41P6+IqHT41P6+I1'N1'T41$

*Go*

$1go=G1T22InKc+I1'K41$ $ogo=IcDo'+IcN1'T41$

*Kg*

$1kg=NR3I2T21Fa'+IqI2+P1I2'GoN5T14P6'+P1I2'Go'N5T14P6+T2MsLD5'C6+GoI4'T14P6'P1+Go'I4'T14P6P1+GoP6'NR13+NR3T2D6'D42D1'N5'+Go'P6NR13+NR3T1D6'D5M7+FaD2'T21$ $okg=G1'KgI1'Do'+T20$

*Do*

$1do=I3G1'R42D6'D42D1'+So'KoI4'I1Do'+So'UiD4'D2'Do'T41+M2C1'Ko+N1K41+U1M7T1$ $odo=HoN5'T14D1I2P1+K41G1'N1'+I1DoT41$

*Mr*

$1mr=MaC6'C5'C4'+MbC6'C5'C4+McC6'C5C4'+MdC6'C5C4+MeC6C5'C4'+MfC6C5'C4+MgC6C5C4'+MhC6C5C4$ $omr=Ma'C6'C5'C4'+Mb'C6'C5'C4+Mc'C6'C5C4'+Md'C6'C5C4+Me'C6C5'C4'+Mf'C6C5'C4+Mg'C6C5C4'+Mh'C6C5C4$

*Ec*

$1ec=A41'B41I1R42'+A1B1'Ka'Te+A1'B1Ka'Te+A1B1KaTe+A1'B1'KaTe+FmP6P5P3'$ $oec=A41B41'I1R42'+T2Fm'$

*P1*

$1p1=P5'P1'T41'+T21$ $op1=P5'P1+T41$

*P2*

$1p2=P1T41'$ $op2=P1'+T41$

*P3*

$1p3=P2T41'$ $op3=P2'+T41$

*P4*

$1p4=P3T41'$ $op4=P3'+T41$

*P5*

$1p5=P4T41'$ $op5=P4'+T41$

*P6*

$1p6=T21$ $op6=T41$

*T41*

$1t41=T40+S1IqI2$ $ot41=T41$

*T1*

$1t1=T41P6$ $ot1=T1$

*Cj*

$1cj=Cj'$ $ocj=Cj$

*Z41* Write $1z41=B1G1R43Ix+G1IcKcDo'+B1G1'R43'Ix+B1'G1R43'Ix+B1'G1'R43Ix+Z1Go+B1InKcGo'R42'+Z1Kc'+Z1I1'$ $oz41=B1'G1'R43'Ix+Z1'Go+B1'InKcGo'R42'+Z1'Kc'+Z1'I1'+B1'G1R43Ix+G1'IcKcDo'+B1G1'R43Ix+B1G1R43'Ix$

*N5*

$1n5=T1InDo'+IcKcT22+KcDoT21+U1M7T1D6+G1'T22InDo'+I4I1'S'KaT1+Td$ $on5=T41+DoT14+T20I4'$

*Nz*

$1nz=FaI2'D4T32+FmG1KgT20D3'$ $onz=I1$

*Fm*

$1fm=N11D6'D4'D2$ $ofm=I1T1+NzT41$

*D6*

$1d6=Z1InKc'Do'N5+SoInT41D5'D42D1+K8Pm+G1IcN5+A1N6KaC4'+B1Go'InN5Kc+Z1GoN5I3a'I2I4'+E1N6KaC4+T31D6'+N11D4'D3'+N11D4'D2Ec+FmC6A2'T1'$ $od6=N5Ka'I4+A1'N6C4'+B1'Go'InN5Kc+G1'IcN5+Z1'GoN5I4'I3a'I2+Z1'InKc'Do'N5+E1'N6C4+T31D6+FmI2D1'T32C6'$

*D5*

$1d5=D6N5+K7Pm+NzT33$ $od5=D6'N5+NzT41$

*D4*

$1d4=D5N5+K6Pm+I3D6'D3'D2'D1T40+NzT33+FaT33+FmT33D3'+FmT33I2+FmDoT32$ $od4=D5'N5+FaEcT41+NzT41+FmT41$

*D3*

$1d3=D4N5+I3aD6'D5'D4T40+I3aD5'D1'T40+K5Pm+NzT41+FmT41D1'$ $od3=D4'N5+A3T41InD6'D5'D42+A1InD6D5'D42T41+NzT33+FmT33I2+FaNz'T41+InDoD6'D4'D2A1'T32$

*D2*

$1d2=D3N5+K4Pm+FaT41$ $od2=D3'N5+D1'InM5T41+A1'InM5T41+I3aNR8A1'+I3NR8R40'T1$

D1
1d1=JoInM5D2T41+M2I2T41+So'InT41M5D2'
+D2N5+A1'KaM2T41+A41'B41D1'MoI2T1
+A41B41'D1'MoI2T1+K3Pm
+Ka'T41NR50Fa'+M2Do+FmI2T41
+A1'KaT33FmI2'Nz'+MooD2'+FaNz'I2'T32
od1=D2'N5+A1KaM2I2'T41+A41B41'MoD1I2T1
+A41'B41MoD1I2T1+NzT41
+A1KaT33FmD3Do'
Fa
1fa=MooD2'
ofa=I1
C6
1c6=D1N5Pm+K2Pm+I3aD5T32+T31D6
1c6=D1N5+I3aD5T32+T31D6
oc6=D1'N5+I3aD5P4'P2'
C5
1c5=C6N5+K1Pm+FaC1ST1'+13aB41T1D5
oc5=C6'N5+FaT2+13aB41'T1D5
C4
1c4=C5N7+I41Ia+O41Io+I3aD5'D4'T40
oc4=C5'N7+I40Ia+O40Io+NR3T1D2+Td
C3
1c3=C4N7+I31Ia+O31Io+FaD1'P6P5P4'P3'
oc3=C4'N7+O30Io+I30Ia+Td+I3aP5'
C2
1c2=C3N7+U1T1D2+I21Ia+O21Io+FaI2T1
oc2=C3'N7+D6D52D1U1T2A40'
+D6D52D1'U1T2R40'+Td+S'MoI2'T1Fa'
+I3aD6'D5'D4D1'C6+U1D4'D2A1'B1T41D5
+U1D5D4'D2A40B40'T2+I20Ia
+D6'D52D4'U1T2A40'+O20Io
+A40T2I3aD6'D5'D4D1C6'
+A40'T2I3aD6'D5'D4D1C6+MooB40'T2D5
+FaI2T2C5'+FmI2T2A40'C5
C1
1c1=C2N7+I2M2+FmT33Ka'D3'+FaT2
oc1=C2'N7+G1KgI3aT20+M1T1+G1KgT20I4
+Td+FaT1+NzT41
R43
1r43=C1N5Do+R2I3aT41'+I4'I1T1+B1G1Ix
or43=C1'N5Do+R2'I3a+Z1'Go'T22InDo+Td
+Z1'GoT2InDo+Z1'GoT2InDo+B1'G1'Ix
+I3aT41
R42
1r42=R43MsLT41'T1'D6+M2D6D1'I2'T1
+A41M2I2T1+R2MoT41'+D2'D1U1R43T1
+D5D2'U1R43'T21D4'+I3D6'D1'P6'P3'P2P1'
+IcDoB41'T22+MooEc'T1D2'+InDoD6'D2T33
or42=R43'MsLT1'D6+M2D1I2'T1+I3a'KcT14
+I3aD52T1+R2'Mo+D5I3a'T14I1'
+K41+I4Tn+N11D2
R41
1r41=R42MsLD6Do'+R42Mo+C2MsdK41
+R2MsdI2'T41'
+R1I3a'+A1I3aI2D6D4D3+R1D6'
+A2M1I2+R1I2dC4'+R1C4D1'
or41=R42'MsLD6Do'+R42'Mo+C2'MsdK41
+R2'MsdI2'T41'+R1I3a'+A1'I3aI2D6D4D3
+R1'D6'+A2'M1I2T41'+R1'I2dC4'
+R1'C4D1'
R40 Write
1r40=SM2Do+A2MsdT41+R41I3a'+R41D4
+R41I2d+R41D6'+R41D3Do'+R41Do'T41'
or40=S'M2Do+A2'MsdT41I2'+R41'D4+R41'I2d
+R41'D6'+R41'D3Do'+R41'Do'T41'
R1
1r1=M2Do'T1+M2D1T1+MoT1+R2M1T41
+R2I3a'+R2D5'Nz'+R2D6'Moo
+FmT41R2D3'Nz'+FaKcT1+FmI2T32
or1=I3aD5T40D6+R2'I3a+R2'D5'+R2'Moo
+FaI2T32+FmI2T1D3'+FmI2'T32
E4
1e4=A1N5Ka+K12Pm
oe4=A'N5+N5Ka'
E3
1e3=E4N5+K11Pm
oe3=E4'N5
E2
1e2=E3N5+K10Pm
oe2=E3'N5
E1
1e1=E2N5+K9Pm
oe1=E2'N5
S
1s=S11Ka+A1B1'Ka'I3a+R10Ka'I3a
+B1Ro1KaI3a+SooKaI3a+I3aC4T41+RooKaI3a
+C6N5I1T13+D6I3N10D3'D1T41
+I4TT41R42'+I3M7NR51
os=SooKa'I3+RooKa'I3+B1Ro1KaI3a
+A1B1'KaI3a+R10KaI3a+S11Ka'T41'
+C6'N5I1T13+I4TnT41+13Ka'T40N10
+R40'I3aC4T1+I3aD6'T1+FaNzT1
A41
1a41=MsLT1'Do'S+C2I3aK41+R1U1D6D52D3D1'
+A1Ho+R42M2DoT41'+A1I1T1'+A1I3D1
+A1U1D53+A1I4N5'+A1B1I3
+A1D5'D2'I4'T1'+C5N6+B1MooD2
+A1U1D6D5'D1+A1'I3aD6'D52D3D1T41'
+A1I3aD2'R42'+B1I3aD2'R42
oa41=MsLDo's'+I4'T1Fa'+A1'I4N5+C2'I3aK41
+A1'I1
+R1'U1D6D52D3D1'+R42'M2DoT41'
+A1'U1D53+A1'Ho+Fa'I4'A1'D2'
+B1'I3D5D1'+C5'N6+B1'MooD2
+A1'U1D6D5'D1+A1I3aD6'D52D3D1T41'
+FaI2T1+A1'I3aD2'R42'+B1'I3aD2'R42
A40
1a40=SI2'NR50+KaMsrFa'+A41I3a'
+A41I2+A41D3
+FaNz'D4'KcT1'+B41FmD4D1Do'I2'
oa40=S'I2'NR50+Ka'MsrFa'+A41'I3a'
+A41'I2
+A41'D3+FaNz'D4'Kc'+B41'FmD4D1Do'
A39 Write
1a39=SMsrT1'+A40I3a'+A40I2Fm'+A40T1I2'
+A40D3I2'+A40D4+A40'FmI2I1'T1
+A40'FmI2T1'
oa39=S'MsrT1'+A40'I3a'+A40'I2Fm'+A40'T1I2'
+A40'D3I2'+A40'D4+A40FmI2I1'T1
+A40'FmI2T1'
A2
1a2=A3
oa2=A3'
A1
1a1=A3M2Do+R41M2I2'Do'T1Fm'+A2I3a'
+A2D3'I2'+A2D5'+A2Do'T1'I2'+A2I2D6
+A2'FmD6'Ec+A3FmD6'Ec'
oa1=A3'M2Do+A2'I2D6+A2'I3a'+A2'D3'I2'
+A2'Do'T1'I2'+A2'D5'+A2FmD6'Ec
+A3'FmD6'Ec'
L41 Write
1L41=MrM6D3'D1'+B1M6LtmS'+L1Do'
+L1I2+L1I1+L1S+L1D3Ka'+L1D2
oL41=Mr'M6D3'D1'+B1'M6LtmS'+L1'Do'
+L1'I2+L1'I1+L1's+L1'D3Ka'+L1'D2
V41 Write
1v41=MrM6D3'D1+B1M6LtmS+V1Do'+V1I2
+V1I1+V1I+V1S'+V1D2
ov41=Mr'M6D3'D1+B1'M6LtmS+V1'Do'+V1'I2
+V1'I1+V1'S'+V1'D2
B41
1b41=MrDoKa'So'+S1RgDo+L1D10S'+V1D10S
A1R42D6D2'I1'+G1'NR1D5+R1NR1D5'
+B1I3aD2+B1I4'Do'R42'
ob41=Mr'DoKa'So'+S1'RgDo+L1'D10S'+V1'D10S
+A1'R42D6D2'I1'+G1NR1D5+R1'NR1D5'
+B1'I3aD2+B1'I4'Do'R42'

B40 Write

1b40=SMoI2+B41I3a'+B41D5D4'+B41MooD1
+B41'MooD1'+B41MoI2'+B41FaD3 ob40=S'MoI2+B41'I3a+B41'D4'+B41'MooD1
+B41MooD1'+U1D52+B41'MoI2'+B41'FaD3

Ka

1ka=S11D1T41'D2+B1RoID1'I3aT41'D5C3'+I1KcT1
+I1KcGo'P5'P3'P2+I4ST41+I3D4T41
+NzT32D5'+FaD4'T32Kc' oka=SooD1I3aKa+RooD1I3aKa+A1B1'D1'I3a
+R10D1'I3a+I3aT41+N11D2+InKcN10D1'T41
+I4S'T41+Ias'P6T13+Z41'I1N1Kc+Moo
+FaD4D1'T32

Kc

1Kc=IcDoKo+UiD3D1DoT40+NR3D4T1Fa'
+S1'UiDoT40+IqG1'H'T41
+U1D52D4'D1'C6A1T40+G1KgI3aT20C1I'Fa'
+I4I1'G1KgT20C1'+MsLD5'C6ST40
+FaI2T41EcD2+FaNzD5T33S+D3NzT32S
+FaI2P6T14C5'D1'+FmI2T32B1'
+FmT32I2D3'A1'+FaD2'A1'B1'T32 okc=U1Fa'NR50+I4'I1K41+Td+MooD2'T2
+FmC1I2'T1'

Jo

1Jo=I2KaD1T41NR50+M2I2Ka'T41
+A1'B1I3D5D4D3+I3aD2NR8T41
+MsLD5'A1T40C5
+Jo'A1'T41I3D5D4D3R43'+A1B1'I3D5D4D3R43
+Kc'FmI12D1'T40A1'B1'Ka'+NzKaT41Fm'
+Kc'FmR1D1A1'B1KaT40
+Kc'FmR1D1A1B1'Ka'T40
+Kc'FmI2D1'T40A1B1Ka+FmI2D1'T32B1' ojo=Td+InT41M5D2D1'+A1B1'I3D5D4D3R43'
+JoB1'T41I3D5D4D3R43'

Mw1 Write

1mwl=L1M6LmT1'+B1M6MtmT1'+I1 omwl=L1'M6Lm+B1'M6Mtm+M6Ka'D3T1

I1

1i1=I1'K41+Td oi1=N11+InD5'D4T41+InD5'Ko

I2

1i2=N1'Go'I2'I1'K41+IcDoKo+Td+IqK41GoR43
+FaNz'I2'KoEc' oi2=NR3KoD4'+I1'GoK41+N1K41+IqT40
+HoT41I2+I2MoKo+FaEcKo

I3a

1i3a=N11D2+U1D52T1+N11D6D4D3 oi3a=K41+Td

I4

1i4=Td+I1DoK41+I3D6'D53Ko oi4=I4K41

Mw2 Write

1mw2=L1'M6Lm+B1'M6Mtm+T1 omw2=L1M6LmT1'+B1M6MtmT1'

SYMBOLS AND SPECIAL GATES

| | |
|---|---|
| CLO=I4I1 | M1=I3aD5D4'D3' |
| D10=DoKa | M2=I3aD5D4'D3 |
| D42=D4D2' | M5=D6D5'D4D3' |
| D52=D5'D2 | M6=I2'I1'DoD4'D2' |
| D53=D5'D3' | M7=D4D3'D2'D1 |
| Ho=I1'DoI3a' | Msd=D6D4'D3'D1I3a |
| Ia=I4I2'I1' | MsL=D4'D3I3aC4' |
| Ic=I4'I2'I1 | Msr=D4'D3'D1I3aI2' |
| In=I4'I2I1 | Mtm=Ka'D3D1 |
| Io=I4I2I1' | N6=I4N5I1' |
| Iq=I4I1 | N7=I4'N5 |
| Ix=I2I1N5R42 | N10=D4'D2' |
| I2d=I2D5'D3' | N11=I2I1DoT41 |
| I3=I4'I1'Do'I3a' | NR1=R42D6'I1'Fm' |
| Ko=Kc'T41 | NR3=I4'I1' |
| K41=KcT41 | NR8=D6'D5'D3D1C6 |
| Lm=D3D1' | NR13=P5P4P3P1SKa'I2 |
| Ltm=KaD3D1 | NR51=TT41 |
| Mo=I3aD5D4D3' | NR50=I3aD5D4D3'Fm' |
| Moo=I3aD5D4D3T41' | OD=I4I2I1'S'Ka' |

| | |
|---|---|
| Pm=I4I2'I1'S | T13=P5'P3P2P1' |
| Roo=A1'R1'C4' | T14=P5P4P3 |
| Ro1=A1'R1 | T20=P5P4P3'P1' |
| R10=A1R1' | T21=T41'P5P4'P3'P2' |
| Soo=A1'B1'C4' | T22=P6P5'P3'P2'P1 |
| S11=A1B1R1I3a | T28=P6P4'P3P1'Ka'Go' |
| T33=P6P5'P3P2P1' | T40=P6P5P4P3'P1' |
| T32=P6P5'P4'P3P2 | Tn=Tp'Tr'Tfp'Tfr' |
| T31=FmI2P6P5P4'P3'D3 | T=Tp+Tr+Tfp+Tfr |
| T2=P6'P5'P3'P2'P1 | Tc=I1'C6Fm' |
| T8=P6'P4'P3P1'Ka'Go | |

Tp=Tape is being punched

Tr=Tape is being read

Tfp=Tape is being punched on auxiliary punch

Tfr=Tape is being read on auxiliary reader

U1=I4'2I1'Do'

Ui=I4'I2'I1'

Ws=I4'I1'D4'D3D2'Do'

CLO=I4I1 Turns "compute" light off

Jo'=Overflow light

D6'–D1'=Channel lights 6 to 1

C6'–C1'=Sector lights 6 to 1

R43'=Half-word light

Compute switch signals:

Halt—Both H and C' signals present

Compute—H' only

Single cycle—H' and C' signals present

Conditions of C2, C3, C4 for input and output:

Electric typewriter keyboard (input and output)—C4'C3'C2'

Electric typewriter punch—C4'C3'C2

Electric typewriter reader—C4'C3'C2

Auxiliary reader and punch—C4'C3C2'

Option—C4'C3C2

Card reader and punch—C4C3'C2'

Automatic—Program may call for input or output automatically.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a computer wherein a left hand and a right hand instruction pair is obtained by a single reference to a location in a memory of said computer in response to a single address code, means responsive to said single address code , means responsive to said single address code for arbitrarily selecting which of said left hand and right hand instruction of a pair is to be carried out, and means for automatically carrying out said right hand instruction subsequent to said left hand instruction if said left hand instruction is designated for execution first provided said left hand instruction does not direct a transfer to a new pair of instructions.

2. In a computer wherein instructions are stored in pairs, one in a first portion of said word and another in a second portion of said word, and wherein said computer selects and reads out of memory a desired word in accordance with a designated address, means for selecting in accordance with said designated address which of said paired instructions is to be carried out, instruction decoding means for determining the nature of an operation to be performed by a selected instruction, including means for determining whether an operand is to be obtained from said memory or whether said selected instruction is to be carried out without reference to the memory for an operand, means for carrying out said selected instruction with or without an operand, as the case may be, means for automatically carrying out the other of said pair of instructions following completion of the first instruction selected when it is selected from said first portion and it does not designate transferring to a new pair of instructions, and means for automatically selecting a new pair of instructions from the next memory location in sequence following completion of the second instruction of a pair unless it designates transferring to a different pair of instructions.

3. In a stored program, digital computer having instructions and operands stored in memory locations, said locations being numbered sequentially for purposes of being addressed and said instructions being stored in pairs, the combination comprising an instruction location counter for storing the address of the next instruction to be executed, said counter having $n+1$ binary digit positions, where $n$ is the number of digits required to address a memory location for a pair of instructions, sequencing means for alternately reading the next pair of instructions from the memory location specified by the most significant $n$ digits of said instruction location counter and executing said pair of instructions under control of at least significant binary digit of said instruction counter, and means for incrementing said instruction counter by one binary digit upon each instruction being executed, whereby all instructions of a stored program may be read in pairs from sequential memory locations and executed in sequence with access to memory locations for only every other pair of instructions.

4. In a stored program, digital computer, the combination as defined in claim 3 including an operation code register for receiving the opertion code of an instruction to be executed, including that of a transfer instruction, decoding means coupled to said operation code register detecting the presence of a transfer operation code, and control means for transferring into said instruction counter an address for the next instruction in response to a transfer operation code detected by said decoding means, said address comprising $n+1$ digits where the least significant binary digit may have either one of two values for a transfer to either one of two instructions of a pair to be read from the memory location specified by the most significant $n$ digits of the address counter.

5. In a stored program, digital computer the combination as defined in claim 4 including means for sequentially transferring the operation code of a given pair of instructions to said operation code register before executing either instruction and means for inhibiting the transfer therein of the operation code of the second if the first of a given pair is to be executed under control of the least significant binary digit of said instruction counter.

6. In a serial stored program, digital computer, having instructions and operands stored at random in memory locations numbered sequentially for purposes of addressing said locations, said instructions being stored in pairs, the combination comprising, an instruction counter for storing the address of the next instruction to be executed, said counter having $n+1$ binary digit positions, where $n$ is the number of digits required to address a memory location, instructions sequencing means for alternately reading the next pair of instructions from the memory location specified by the most significant $n$ digits of said instruction counter and executing said pair of instructions in sequence under control of the least significant binary digit of said instruction counter, an operation code register, and means for sequentially transferring the operation code of a given pair of instructions to said operation code register before executing either instruction and means for inhibiting the registration therein of the operation code of the second if the first of a given pair is to be executed under control of the least significant binary digit of said instruction location counter.

7. In a serial, stored program, digital computer, the combination as defined in claim 6 including an instruction register, and means for transferring a pair of instructions to said instruction register from a memory location specified by said instruction counter under control of said instruction sequencing means, and wherein said means for sequentially transferring the operation code of a given pair of instructions into said operation code register comprises a gate for sequentially translating the operation code of the first and second of said pair of instructions from said instruction register to said operation code register, and means under control of said least significant digit of said instruction counter for closing said gate thereby inhibiting the operation code of the second of said pair of instructions from being transferred to said operation code register if said least significant digit specifies that the first instruction of said pair is to be executed.

8. In a serial, stored program, digital computer, the combination as defined in claim 7 including means for executing instructions the operation code of which is transferred into said operation code register and means for incrementing the $n+1$ binary digit number in said instruction location counter by a unit in the least significant digit position in response to the execution of each instruction.

9. In a serial, stored program, digital computer having instructions and operands stored at random in recirculating memory channel locations numbered sequentially, the combination of a mode control section for reading instructions from memory locations specified by an instruction location counter under the control of a first mode control signal generated for fetching new instructions and for reading operands from memory locations specified by the address portion of an instruction under the control of a second control mode signal generated for fetching operands, a static register adapted to receive channel address codes and a recirculating register adapted to receive sector address codes, first means for generating said first mode control signal after the execution of a previous instruction, second means under control of said first mode control signal for transferring the channel address of the next instruction from said location counter to said static register and for transferring the sector address of the next instruction from said location counter to said static register, third means under control of said static register for reading the channel specified by the contents thereof for comparing the address of each sector to be read next in sequence in said channel, and for producing an identity signal when the sector specified by the contents of said recirculating register, under control of said first mode control signal or said second mode control signal, a third register adapted to receive all instructions and operands read from memory, means under control of said identity signal for transferring into said third register the contents of said sector to be read next in sequence from said channel specified by the contents of said static register, fourth means for generating said second mode control signal immediately after said transfer into said third register, fifth means under control of said second major mode signal for transferring the contents of said third register to said recirculating register as the next instruction to be executed, and sixth means under control of said second mode control signal for transferring the channel address of an operand specified by the next instruction to be executed in said recirculating register into said static register whereby the operand specified is transferred into said third register by said third means.

10. In a serial, stored program, digital computer, the combination as defined in claim 9 wherein an instruction transferred from memory to said third register includes an indexing digit in a predetermined position indicating that the address portion of the instruction is to be modified by the contents of an index register, including means for sampling said predetermined position for the presence of an indexing digit while said instruction is being transferred to said third register from a memory location, and for producing an indexing control signal, and means under control of said indexing control signal for algebraically combining the contents of said index register with the address portion of said instruction as said instruction is transferred to said recirculating register.

11. In a serial, stored program, digital computer, the combination as defined in claim 10 wherein said static register includes digit positions for the operation code of an instruction to be executed and said sixth means transfers said operation code into said static register, including, means for decoding the operation specified by said instruction, means under control of said decoding means for immediately executing the operation specified when it is of the type not requiring an operand, and means under control of said decoding means and said second mode control signal for inhibiting said third means, whereby an operand is not transferred into said third register.

12. In a serial, stored program, digital computer, the combination as defined in claim 10 wherein instructions are transferred from memory to said third register in pairs, both the first and second instructions of a pair being read from a single memory location, wherein said instruction location counter has $n+1$ binary digit positions, and $n$ is the number of digits required to address a memory location, and wherein said pair of instructions are transferred to said recirculating register as one group of binary digits, and wherein said sixth means includes an instruction sequencing means under control of said second major mode signal for executing said pair of instructions in sequence under control of the least significant digit of said instruction location counter, and said instruction location counter including means for incrementing the $n+1$ digit number stored therein as each instruction if a stored program is executed, whereby instructions read in pairs are executed under control of the least significant digit thereof and pairs of instructions are read from memory in sequence under control of the $n$ most significant digits thereof.

13. In a serial, stored program, digital computer, as defined in claim 12, wherein said static register includes digit positions for the operation code of an instruction to be executed and said sixth means transfers said operation code into said static register, including means for decoding the operation specified by said instruction, means under control of said decoding means for immediately executing the operation specified when it is of the type not requiring an operand, and means under control of said decoding means and said second major mode signal for inhibiting said third means, whereby an operand is not transferred into said third register.

References Cited by the Examiner

UNITED STATES PATENTS

| | | | |
|---|---|---|---|
| 2,914,248 | 11/1959 | Ross et al. | 235—157 |
| 3,077,984 | 2/1963 | Johnson | 340—172.5 X |

OTHER REFERENCES

Pages 5–10, 37–51, 75–78 and 91–100 relied on, 1959, Manual of Operation, The Central Computer of the Univac System, Remington Rand Univac.

Pages 1–11, 1958, I.B.M. 650 Data Processing System Bulletin.

ROBERT C. BAILEY, *Primary Examiner.*

MALCOLM A. MORRISON, *Examiner.*